United States Patent
Senthilnathan et al.

(10) Patent No.: US 12,134,481 B2
(45) Date of Patent: Nov. 5, 2024

(54) AIRCRAFT THERMAL MANAGEMENT SYSTEM

(71) Applicant: Bell Textron Inc., Fort Worth, TX (US)

(72) Inventors: Thuvaragan Senthilnathan, Laval (CA); Chen Kuang, Montreal (CA)

(73) Assignee: Textron Innovations Inc., Providence, RI (US)

( * ) Notice: Subject to any disclaimer, the term of this patent is extended or adjusted under 35 U.S.C. 154(b) by 271 days.

(21) Appl. No.: 17/192,478

(22) Filed: Mar. 4, 2021

(65) Prior Publication Data

US 2022/0281613 A1  Sep. 8, 2022

(51) Int. Cl.
    | B64D 33/08 | (2006.01) |
    | B64D 13/06 | (2006.01) |
    | B64D 27/24 | (2006.01) |
    | B64C 27/82 | (2006.01) |

(52) U.S. Cl.
    CPC ............ B64D 33/08 (2013.01); B64D 13/06 (2013.01); B64D 27/24 (2013.01); *B64C 2027/8209* (2013.01); *B64C 2027/8227* (2013.01); *B64D 2013/0614* (2013.01); *B64D 2013/0644* (2013.01)

(58) Field of Classification Search
    CPC ........ B64D 33/08; B64D 13/06; B64D 27/24; B64D 2013/0644; B64D 2013/0625; B64C 2027/8209; B64C 2027/8227
    See application file for complete search history.

(56) References Cited

U.S. PATENT DOCUMENTS

| 6,344,700 | B1 |   | 2/2002 | Eisenhauer et al. |
| 7,012,392 | B2 |   | 3/2006 | Nguyen et al. |
| 7,841,431 | B2 | * | 11/2010 | Zhou ............... B60H 1/00278 |
|           |    |   |         | 180/65.1 |
| 8,402,776 | B2 |   | 3/2013 | Johnston et al. |
| 8,620,506 | B2 | * | 12/2013 | Kummer ............ H01M 10/443 |
|           |    |   |         | 180/65.21 |
| 8,901,861 | B2 | * | 12/2014 | Luke .................... H02J 7/007 |
|           |    |   |         | 318/370 |
| 9,065,103 | B2 |   | 6/2015 | Straubel et al. |
| 9,488,109 | B2 |   | 11/2016 | Sowden |
| 10,526,085 | B2 |   | 1/2020 | Fenny |
| 10,703,471 | B2 |   | 7/2020 | Fenny et al. |
| 10,787,253 | B2 |   | 9/2020 | Parsons et al. |

(Continued)

OTHER PUBLICATIONS

U.S. Appl. No. 16/556,965, filed Aug. 2019, Bell Textron Inc.

(Continued)

*Primary Examiner* — Michael H Wang
(74) *Attorney, Agent, or Firm* — Akona IP PC

(57) ABSTRACT

Various implementations directed to an aircraft thermal management system are provided. In one implementation, an aircraft may include a fuselage having one or more fuselage sections. The aircraft may also include one or more electric motors configured to drive one or more propulsion systems of the aircraft, where the one or more electric motors are configured to generate thermal energy. The aircraft may further include an aircraft thermal management system configured to transfer the thermal energy generated by the one or more electric motors to the one or more fuselage sections.

18 Claims, 13 Drawing Sheets

(56) References Cited

U.S. PATENT DOCUMENTS

| | | | |
|---|---|---|---|
| 2006/0108867 A1* | 5/2006 | Ralea | B60T 13/741 |
| | | | 303/152 |
| 2007/0144800 A1* | 6/2007 | Stone | B60L 7/22 |
| | | | 180/65.31 |
| 2013/0166119 A1* | 6/2013 | Kummer | B60L 1/003 |
| | | | 701/22 |
| 2017/0349276 A1 | 12/2017 | Fenny | |
| 2018/0111680 A1 | 4/2018 | Fenny et al. | |
| 2018/0208305 A1 | 7/2018 | Lloyd et al. | |
| 2018/0222286 A1* | 8/2018 | Blatchley | H01M 10/625 |
| 2018/0319283 A1 | 11/2018 | Battin et al. | |
| 2019/0031339 A1 | 1/2019 | McCullough et al. | |
| 2019/0055016 A1 | 2/2019 | Groninga et al. | |
| 2020/0290735 A1 | 9/2020 | Acee et al. | |
| 2020/0298970 A1 | 9/2020 | Acee et al. | |
| 2020/0339010 A1* | 10/2020 | Villanueva | H01M 50/249 |
| 2020/0391876 A1* | 12/2020 | Morrison | H02K 11/33 |
| 2021/0053689 A1* | 2/2021 | Lynn | H01M 10/617 |
| 2021/0061477 A1* | 3/2021 | Heironimus | H01M 10/62 |

OTHER PUBLICATIONS

U.S. Appl. No. 16/557,842, filed Aug. 2019, Bell Textron Inc.
"Electric Motor Thermal Management Research Annual Progress Report," Kevin Bennion, National Renewable Energy Laboratory, Oct. 2017.

* cited by examiner

AIRCRAFT THERMAL MANAGEMENT SYSTEM

STATEMENT REGARDING FEDERALLY SPONSORED RESEARCH OR DEVELOPMENT

Not applicable.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Some aircraft, including some helicopters and other rotorcraft, may utilize petroleum-based fuels to power one or more internal combustion engines in order to generate propulsion. However, the use of such engines may not always be desirable for any number of reasons, such as excessive emissions, noise, a relatively high cost due to production, maintenance, and training, a relatively high risk of failure during operation, and/or the like. To mitigate one or more of these issues, some aircraft may instead use one or more electric motors to drive one or more aircraft propulsion systems. For example, a helicopter may use one or more electric motors to drive a main rotor system and/or a tail rotor system.

SUMMARY

Described herein are implementations of various technologies relating to an aircraft thermal management system. In one implementation, an aircraft may include a fuselage having one or more fuselage sections. The aircraft may also include one or more electric motors configured to drive one or more propulsion systems of the aircraft, where the one or more electric motors are configured to generate thermal energy. The aircraft may further include an aircraft thermal management system configured to transfer the thermal energy generated by the one or more electric motors to the one or more fuselage sections.

In another implementation, an aircraft may include a fuselage having one or more fuselage sections. The aircraft may also include one or more electric motors configured to drive one or more propulsion systems of the aircraft, where the one or more electric motors are configured to generate thermal energy. The aircraft may further include an aircraft thermal management system configured to transfer the thermal energy generated by the one or more electric motors to the one or more fuselage sections using one or more resistors and a fluid heat transfer system.

In yet another implementation, a helicopter may include a fuselage having one or more fuselage sections. The helicopter may also include a tail rotor system having a distributed propulsion system, where the tail rotor system includes a plurality of tail rotors driven by a plurality of electric motors, and where the plurality of electric motors are configured to generate thermal energy. The helicopter may further include an aircraft thermal management system configured to transfer the thermal energy generated by the plurality of electric motors to the one or more fuselage sections.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Various implementations directed to an aircraft thermal management system will now be described in the following paragraphs with reference to FIGS. 1-13.

An aircraft may use one or more electric motors to drive one or more aircraft propulsion systems. Such an aircraft may hereinafter be referred to as an "electric aircraft." In particular, an electric aircraft may include, but is not limited to, the following: an aircraft having its one or more aircraft propulsion systems driven using one or more electric motors only, a hybrid aircraft having its one or more aircraft propulsion systems driven using multiple motor types (at least one of which is an electric motor), and/or the like.

The one or more aircraft propulsion systems of the electric aircraft may include one or more rotor systems, one or more propeller systems, and/or any other components used in propulsion systems known to those skilled in the art. Accordingly, electric aircraft, as referred to herein, may include any type of aircraft that uses a rotor system and/or a propeller system, such as, but not limited to, the following: rotorcraft (e.g., a helicopter, a gyrocopter, and/or the like), ultralight aircraft, vertical take-off and landing (VTOL)

aircraft, sport aviation aircraft, military aircraft, general aviation aircraft, commercial passenger aircraft, and/or any other aircraft known to those skilled in the art. In addition, the electric aircraft can be any type of manned or unmanned aircraft known to those skilled in the art. Manned aircraft may refer to aircraft configured to transport a human pilot and that may also be configured to transport one or more other human passengers, whereas unmanned aircraft may refer to aircraft that do not transport a human pilot.

Figure 1:
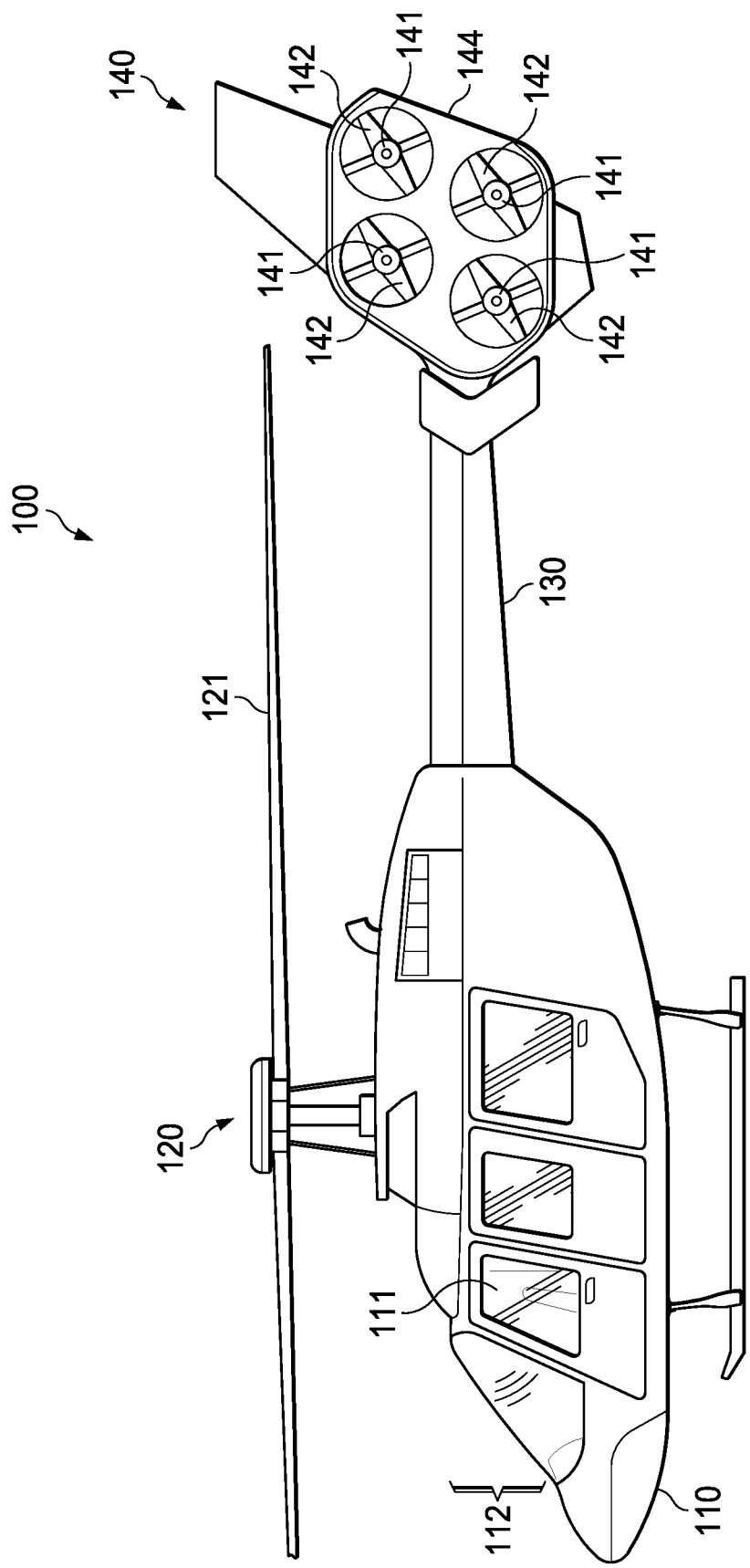
FIG. 1 illustrates a schematic diagram of a helicopter in accordance with implementations of various techniques described herein.

In one implementation, an electric aircraft may be a helicopter that uses one or more electric motors to drive one or more aircraft propulsion systems (e.g., a main rotor system and/or a tail rotor system). For example, FIG. 1 illustrates a schematic diagram of a helicopter 100 in accordance with implementations of various techniques described herein, where the helicopter 100 may include a tail rotor system 140 having a plurality of electric motors 141 configured to drive a plurality of tail rotors 142. As shown, the helicopter 100 may also include a fuselage 110, a main rotor system 120, and a tail member 130.

The fuselage 110 may be a central main body of the helicopter 100 and may include one or more fuselage sections, where such sections may include a cabin section 111, a battery section (not shown), an airframe section (not shown), a window section 112, and/or the like. A fuselage section may be any area and/or compartment of a fuselage known to those skilled in the art. The cabin section 111, the battery section, the airframe section, and the window section 112 are described in further detail in sections below.

The main rotor system 120 may be carried by the fuselage 110 and may include main rotor blades 121. The main rotor blades 121 may be used to provide flight for the helicopter 100 and may be controlled using one or more computing systems (not shown) disposed in the fuselage 110. In one such implementation, a pilot may use the one or more computing systems to change a pitch angle of the main rotor blades 121 and to provide vertical, horizontal, and yaw flight control. In a further implementation, the main rotor system 120 may also be driven using one or more electric motors (not shown).

The tail member 130 may be coupled to the fuselage 110 and may be used to support the tail rotor system 140 at an aft end of the helicopter 100. The tail rotor system 140 may be a distributed propulsion system having the plurality of tail rotors 142 (i.e., fans), each directly driven by an electric motor 141. The distributed propulsion system 140 may be implemented as an electric distributed anti-torque (EDAT) system that includes two or more fixed pitch tail rotors. As shown, the EDAT system 140 includes four fixed pitch tail rotors 142 supported by a structure 144, where the structure 144 may hereinafter be referred to as a "fin." Each of the tail rotors 142 can be operated individually or in groups to provide counter-torque force for transversely stabilizing the helicopter 100. As is known to those skilled in the art, the physical configuration and/or arrangement of a distributed propulsion system can vary, and any such system may be used by an electric aircraft. For example, an electric aircraft may use a distributed propulsion system that includes more than four fixed pitch tail rotors driven by more than four electric motors. Various implementations for a distributed propulsion system are disclosed in U.S. patent application Ser. No. 15/598,842, the entire disclosure of which is herein incorporated by reference.

The one or more electric motors used by an electric aircraft may include any type of electric motor known to those skilled in the art. Such motors may include, but are not limited to, the following: a self-commutated motor, an externally commutated motor, a brushed motor, a brushless motor, a linear motor, an alternating current (AC)/direct current (DC) synchronized motor, an electronic commutated motor, a mechanical commutator motor (AC or DC), an asynchronous motor (AC or DC), a pancake motor, a three-phase motor, an induction motor, an electrically excited DC motor, a permanent magnet DC motor, a switched reluctance motor, an interior permanent magnet synchronous motor, a permanent magnet synchronous motor, a surface permanent magnet synchronous motor, a squirrel-cage induction motor, a switched reluctance motor, a synchronous reluctance motor, a variable-frequency drive motor, a wound-rotor induction motor, an ironless or coreless rotor motor, or a wound-rotor synchronous motor.

In some scenarios, the one or more electric motors of an electric aircraft may generate thermal energy (i.e., heat). For example, while an electric motor is in operation, one or more components of the electric motor may generate heat due to losses (e.g., resistive losses, magnetic losses, and/or the like). Components generating the heat may include one or more windings, one or more stator components (e.g., stator core, stator laminations, and/or the like), one or more rotor components (e.g., rotor core, rotor laminations, and/or the like), and/or any other components known to those skilled in the art. In such an example, the heat (i.e., thermal energy) generated by these components may be transferred into a medium proximate to the electric motor (e.g., air surrounding the electric motor), such that the thermal energy may be dissipated away from the electric motor.

In another example, an electric motor may generate heat in response to a deceleration of the electric aircraft. In such an example, in order to decelerate the electric aircraft, power may be disconnected from the electric motor. However, the electric motor may continue to rotate and thus may behave as an electric generator. In particular, the electric motor may generate electrical energy (i.e., regenerated energy), which may then be returned to a power circuit. To prevent overvoltage and/or damage to the power circuit, one or more resistors may receive the regenerated energy from the electric motor and then dissipate at least a portion of this energy as heat. In such an example, the heat (i.e., thermal energy) may be dissipated into a medium proximate to the one or more resistors (e.g., air surrounding the one or more resistors), such that the thermal energy may be dissipated away from the one or more resistors.

Thus, in some scenarios, the thermal energy generated by the one or more electric motors may be dissipated and may go unused by the electric aircraft. In view of the above, various implementations described herein may include an aircraft thermal management system for an electric aircraft. The aircraft thermal management system may be configured to transfer thermal energy generated by one or more electric motors of the electric aircraft to one or more of its fuselage sections. In such implementations, the use of conventional heating, ventilation, and air conditioning (HVAC) systems for the electric aircraft may be reduced or altogether eliminated, thereby decreasing the weight carried by the electric aircraft and/or increasing available space onboard.

I. Aircraft Thermal Management System

An aircraft thermal management system of an electric aircraft may transfer thermal energy generated by one or more of its electric motors to one or more of its fuselage sections for various uses. In particular, by transferring this thermal energy, the aircraft thermal management system can be used to regulate one or more temperatures of one or more of the fuselage sections. As noted above, the one or more fuselage sections may include any area and/or compartment of a fuselage known to those skilled in the art, including, but not limited to, the following: a cabin section, a battery section, an airframe section, and/or a window section. These fuselage sections are described in further detail in sections below.

Figure 2:
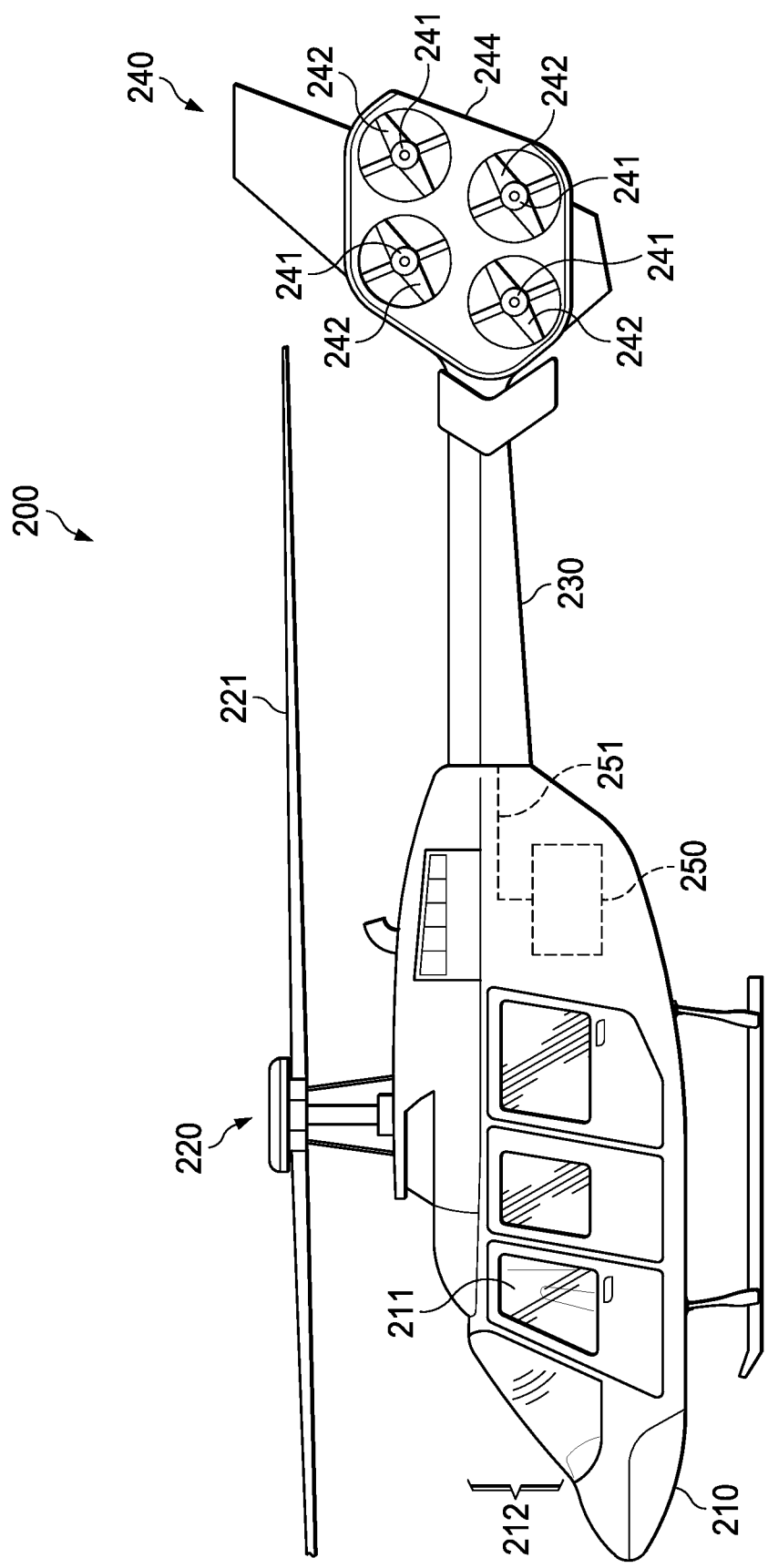
FIG. 2 illustrates a schematic diagram of a helicopter having an aircraft thermal management system in accordance with implementations of various techniques described herein.

FIG. 2 illustrates a schematic diagram of a helicopter 200 having an aircraft thermal management system 250 in accordance with implementations of various techniques described herein. As shown, the helicopter 200 may include a fuselage 210, a main rotor system 220, a tail member 230, and a tail rotor system 240. The helicopter 200, the fuselage 210, the main rotor system 220, the tail member 230, the tail rotor system 240, and their components may, respectively, be the same as the helicopter 100, the fuselage 110, the main rotor system 120, the tail member 130, the tail rotor system 140, and their components, respectively, as described above with respect to FIG. 1. In particular, the fuselage 210 may include one or more fuselage sections, such as a cabin section 211, a battery section (not shown), an airframe section (not shown), a window section 212, and/or the like. Further, the main rotor system 220 may include main rotor blades 221, and the tail rotor system 240 may be an EDAT system that includes a plurality of tail rotors 242 driven by a plurality of electric motors 241. While various implementations for an aircraft thermal management system are described below with respect to the helicopter 200, those skilled in the art will understand that the aircraft thermal management systems disclosed herein can be implemented with any type of electric aircraft known in the art, including the electric aircraft mentioned previously.

The aircraft thermal management system 250 may include any component known to those skilled in the art that can be used to transfer thermal energy generated by an electric motor to a fuselage section. In some implementations, the components of the aircraft thermal management system 250 may include, but are not limited to, the following: one or more resistors, one or more fans, one or more sensors, one or more computing systems, one or more valves, one or more air outlets, one or more thermal channels, one or more heat exchangers, one or more pumps, and/or the like.

The aircraft thermal management system 250 may also include one or more connections 251, where the one or more connections 251 may be used by the electric motors 241 for generating the thermal energy and/or for transferring the thermal energy generated by the electric motors 241. Though not shown in FIG. 2, the one or more connections 251 may be coupled to the electric motors 241 and may be disposed within or alongside the fuselage 210, the tail member 230, and/or the tail rotor system 240. As described further in sections below, the one or more connections 251 may include one or more electrical wires, one or more thermal channels, and/or the like.

As shown, the aircraft thermal management system 250 may be disposed in the fuselage 210. In a further implementation, components of the aircraft thermal management system 250 may be at least partially disposed in more than one fuselage section of the helicopter 200. Various implementations of the aircraft thermal management system 250 are described in further detail in sections below.

A. Resistor System

As explained earlier, the electric motors 241 of FIG. 2 may generate thermal energy (i.e., heat) in response to a deceleration of the helicopter 200. In particular, during and/or after the deceleration, one or more resistors (not shown) may be used to receive regenerated energy from the electric motors 241 and then dissipate at least a portion of the regenerated energy as thermal energy. The one or more resistors may include any electrical resistance element known to those skilled in the art and may also include any number of such elements. For example, the one or more resistors may include a bank of grid resistors. The one or more resistors may hereinafter be referred to, collectively, as a "resistor system." In some implementations, the resistor system may include a housing structure configured to contain the one or more resistors of the resistor system.

In one implementation, the aircraft thermal management system 250 may be configured to transfer the thermal energy generated by the electric motors 241 in response to the deceleration of the helicopter 200, such as during and/or after the deceleration of the helicopter 200. In one such implementation, the aircraft thermal management system 250 may include the resistor system described above, and the aircraft thermal management system 250 may be configured to transfer the thermal energy dissipated by the resistor system to one or more fuselage sections for various uses. In particular, by transferring the thermal energy to the fuselage sections, the aircraft thermal management system 250 can be used to regulate one or more temperatures of the fuselage sections. Various implementations of an aircraft thermal management system 250 that includes the resistor system are further described below.

1. Cabin Section

In one implementation, the aircraft thermal management system 250 of FIG. 2 may use a resistor system (not shown) to transfer thermal energy to the cabin section 211, where the thermal energy may have been generated by the electric motors 241 in response to a deceleration of the helicopter 200. The cabin section 211 may include an area of the fuselage 210 in which a cabin is disposed. As is known in the art, the cabin of an electric aircraft may be configured to transport one or more human pilots, one or more human passengers, and/or cargo. In some implementations, the aircraft thermal management system 250 may be used to regulate an ambient temperature of an atmosphere of the cabin section 211, including the cabin. An ambient temperature of the atmosphere of the cabin section 211 may hereinafter be referred to as a cabin temperature.

Figure 3:
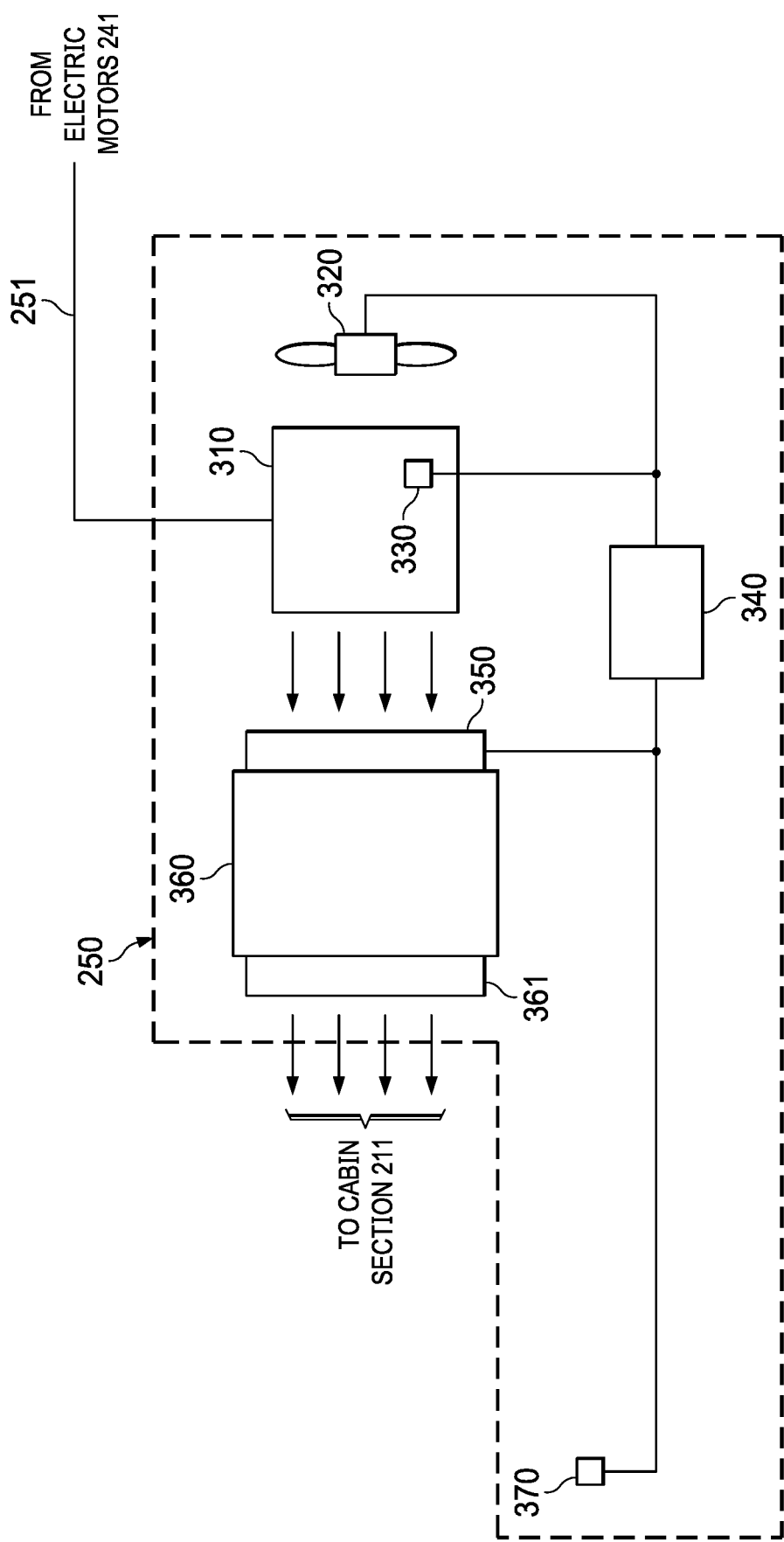
FIG. 3 illustrates a schematic diagram of an aircraft thermal management system in accordance with implementations of various techniques described herein.

The aircraft thermal management system 250 may, along with the resistor system, include any components known to those skilled in the art that can be used to transfer the thermal energy to the cabin section 211. For example, FIG. 3 illustrates a schematic diagram of the aircraft thermal management system 250 in accordance with implementations of various techniques described herein, where the aircraft thermal management system 250 includes a resistor system 310. As shown in FIG. 3, the aircraft thermal management system 250 may also include the one or more connections 251, a fan 320, a resistor temperature sensor 330, a computing system 340, a valve 350, an air outlet 360, and a cabin temperature sensor 370. As noted above, the aircraft thermal management system 250 may be disposed in the fuselage 210 (not shown). In a further implementation, one or more components of the aircraft thermal management system 250 may be disposed within and/or proximate to the cabin section 211 (not shown), where such components may include the cabin temperature sensor 370, at least a portion of the computing system 340, and/or the like.

As explained earlier, the resistor system 310 may include any type of electrical resistance element known to those skilled in the art and may also include any number of such elements. As also explained earlier, the resistor system 310 may be used to dissipate regenerated energy as heat (i.e., thermal energy) in response to a deceleration of the helicopter 200 (not shown). The one or more connections 251 may be coupled to the resistor system 310 and to the electric motors 241 (not shown), such that the connections 251 may be used to transfer the regenerated energy to the resistor system 310 from the electric motors 241. Accordingly, the connections 251 may be used by the electric motors 241 to generate thermal energy via the resistor system 310.

The one or more connections 251 may include any type of connection known in the art capable of transferring the regenerated energy, including, but not limited to, one or more electrical wires, one or more electrical cables, one or more busbars, and/or the like. As shown in FIG. 3, the one or more connections 251 may be a busbar coupled to the resistor system 310. Though not shown, each resistor of the resistor system 310 may be coupled to the busbar 251 using one or more electrical wires, one or more electrical cables, and/or the like.

Figure 4:
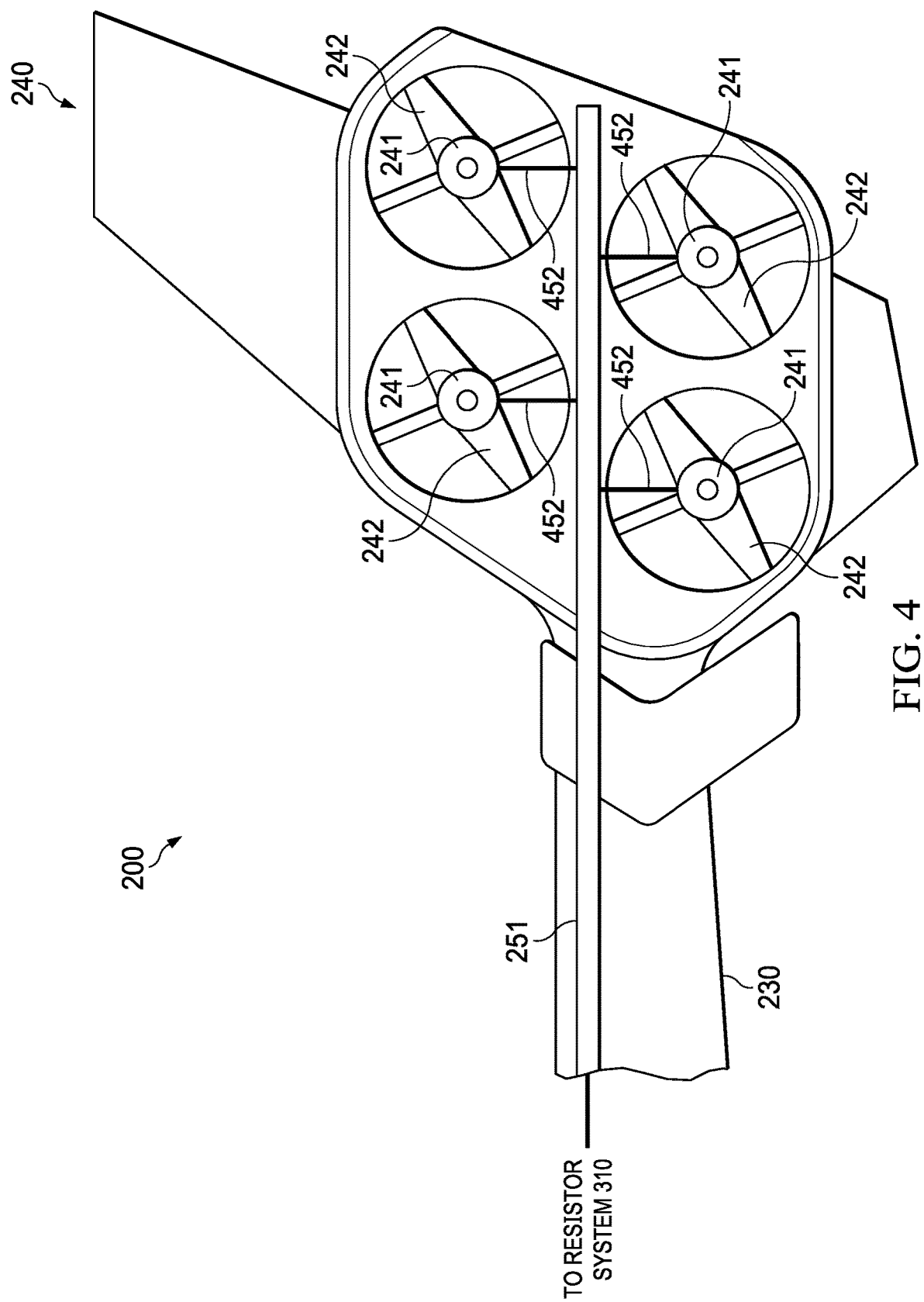
FIG. 4 illustrates a cross-sectional view of a portion of a helicopter in accordance with implementations of various techniques described herein.

FIG. 4 illustrates a cross-sectional view of a portion of the helicopter 200 in accordance with implementations of various techniques described herein, where the busbar 251 may be coupled to the electric motors 241. As shown, each electric motor 241 may be coupled to the busbar 251 using an electrical wire 452, though the electric motors 241 may be coupled to the busbar 251 using any other forms of connection known in the art. In particular, the electric motors 241 may use the electrical wires 452 to transfer regenerated energy to the busbar 251, and the busbar 251 may then be used to transfer the regenerated energy to the resistor system 310 (not shown). The busbar 251 may be disposed inside of the fuselage 210 (not shown), the tail member 230, and the tail rotor system 240. However, those skilled in the art will understand that the busbar 251 may be positioned outside of the fuselage 210, the tail member 230, and/or the tail rotor system 240. Further, though not shown, those skilled in the art will understand that, instead of a busbar, the one or more connections 251 may include multiple electrical wires, where each electric motor 241 may be coupled to a dedicated electrical wire that is also coupled to the resistor system 310.

Returning to FIG. 3, in one implementation, the fan 320 of the aircraft thermal management system 250 may be used to circulate the dissipated thermal energy away from the resistor system 310. In one such implementation, after receiving regenerated energy via the busbar 251 in response to a deceleration of the helicopter 200, the resistor system 310 may be used to dissipate at least a portion of the regenerated energy as thermal energy. In particular, the thermal energy may be dissipated by the resistor system 310 into the air proximate to the resistor system 310, which may cause this air to be heated. Thus, the heated air may include the thermal energy dissipated by the resistor system 310. The fan 320 may then be used to circulate the heated air (i.e., the dissipated thermal energy) away from resistor system 310. By helping to circulate the dissipated thermal energy away from resistor system 310, the fan 320 may facilitate a cooling of the resistor system 310 and thus may also help to prevent the resistor system 310 from overheating. The fan 320 may be any fan known to those skilled in the art.

The valve 350 and the air outlet 360 may be used to transfer the thermal energy dissipated by the resistor system 310 to the cabin section 211. In particular, the fan 320 may be configured to circulate the heated air (i.e., the dissipated thermal energy) away from the resistor system 310 and toward the valve 350. Thus, the valve 350 may be configured to receive a flow of the heated air via the resistor system 310 and the fan 320. In some instances, the valve 350 may then be used to direct this flow of heated air to the air outlet 360. The valve 350 may be any valve known to those skilled in the art, including, but not limited to, a damper valve. In a further implementation, the valve 350 may be controlled using one or more actuators (not shown).

The air outlet 360 may be configured to receive the flow of heated air via the valve 350, such that the heated air may pass through the air outlet 360 and to the cabin section 211 via one or more openings 361 of the air outlet 360. The air outlet 360 may include any outlet known to those skilled in the art, including, but not limited to, one or more air ducts, one or more air pipelines, and/or the like. In some implementations, the air outlet 360 may be a component of an HVAC system (not shown) of the helicopter 200. Those skilled in the art will understand that the air outlet 360 and its one or more openings 361 are not limited to the configuration shown in FIG. 3. In particular, the air outlet 360 may be of any size or shape. For example, the air outlet 360 may extend the length of the cabin section 211. Further, the air outlet 360 may include any number of openings 361 configured to transfer the flow of heated air to the cabin section 211, where the openings 361 may be disposed in and/or may be proximate to the cabin section 211 at any number of locations. For example, the air outlet 360 may include an opening (not shown) that is positioned toward a front of the cabin section 211, such that the heated air from the air outlet 360 may flow toward the front of one or more human pilots and/or one or more human passengers.

Thus, the fan 320, the valve 350, and the air outlet 360 may be used together to direct the heated air (i.e., the thermal energy dissipated by the resistor system 310) to the cabin section 211, thereby helping to transfer the thermal energy dissipated by the resistor system 310 to the cabin section 211. As a result, an atmosphere of the cabin section 211 may be warmed by the heated air (i.e., the thermal energy dissipated by the resistor system 310). In a further implementation, the valve 350 may be adjusted so that it may instead direct the flow of heated air (i.e., the thermal energy dissipated by the resistor system 310) to an exterior of the helicopter 200 using a different air outlet (not shown), thereby helping to transfer the thermal energy dissipated by the resistor system 310 away from the cabin section 211 and to the outside of the helicopter 200. In such an implementation, the valve 350 may be adjusted by controlling one or more of its actuators.

The resistor temperature sensor 330 may be positioned on, in, or proximate to the resistor system 310. In particular, the resistor temperature sensor 330 may be used to measure a temperature of the resistor system 310, which may hereinafter be referred to as a resistor temperature. Similarly, the cabin temperature sensor 370 may be positioned in or proximate to the cabin section 211, such that the cabin temperature sensor 370 may be used to measure the cabin temperature. Any sensor known to those skilled in the art may be used for either the resistor temperature sensor 330 or the cabin temperature sensor 370.

The computing system 340 may be used to control the aircraft thermal management system 250, such as by communicating with one or more components of the aircraft thermal management system 250. In one implementation, the computing system 340 may be in communication with the fan 320, the valve 350, the resistor temperature sensor 330, and/or the cabin temperature sensor 370. In such an implementation, the computing system 340 may be used to control the operation of the fan 320, such as by controlling a fan speed and/or whether the fan 320 is operational. In another implementation, the computing system 340 may be used to control one or more actuators of the valve 350, such that the computing system 340 may control a direction of the flow of heated air received by the valve 350 (e.g., whether the heated air is directed to the air outlet 360 or to an exterior of the helicopter 200). In yet another implementation, the computing system 340 may be configured to receive one or more measurements from the resistor temperature sensor 330 and/or the cabin temperature sensor 370. The computing system 340 may also be in communication with and/or used to control other components of the helicopter 200, such as the main rotor system 220 (not shown), the tail rotor system 240 (not shown), one or more other onboard electric components, and/or one or more other onboard computing systems. The computing system 340 may communicate with one or more components of the aircraft thermal management system 250 and/or with other components of the helicopter 200 using any type of communication (e.g., wired and/or wireless) known to those skilled in the art.

As noted above, at least a portion of the computing system 340 may be disposed within and/or proximate to the cabin section 211. In some implementations, this portion of the computing system 340 may include one or more input devices (not shown) and/or one or more output devices (not shown). In particular, these input devices and/or output devices may be accessible to one or more human pilots and/or one or more human passengers. The one or more input devices may include, but are not limited to, an electronic switch, an electronic button, a keyboard, a pointing device, a mouse, a stylus, a camera, a touch sensitive panel (e.g., a touch pad, a touch screen, and/or the like), another computing device, an audio input device, and/or the like. In addition, the one or more output devices may include, but are not limited to, a liquid crystal display (LCD), a light-emitting diode (LED) display, an organic LED (OLED) display, any other display device, one or more speakers, and/or the like. The computing system 340 is described in further detail in a later section.

In operation, the aircraft thermal management system 250 may use the above-described components to transfer thermal energy to the cabin section 211, where the thermal energy may have been generated by the electric motors 241 during and/or after a deceleration of the helicopter 200. In particular, the aircraft thermal management system 250 may use the above-described components to regulate the cabin temperature of the cabin section 211.

Initially, such as after a takeoff of the helicopter 200, the aircraft thermal management system 250 may use the above-described components to facilitate a cooling of the resistor system 310 during and/or after a deceleration of the helicopter 200, such as to prevent an overheating of the resistor system 310. As explained earlier, the resistor system 310 may receive regenerated energy from the electric motors 241 via the busbar 251 in response to the deceleration of the helicopter 200, and the resistor system 310 may then dissipate at least a portion of the regenerated energy as thermal energy. The thermal energy may be dissipated into the air proximate to the resistor system 310, which may cause this air to be heated. The computing system 340 may control the fan 320 so that it may circulate the heated air (i.e., the dissipated thermal energy) away from resistor system 310 and toward the valve 350. Thus, the valve 350 may receive a flow of the heated air via the resistor system 310 and the fan 320. The computing system 340 may control one or more actuators of the valve 350 so that the valve 350 may direct the flow of heated air to an exterior of the helicopter 200 using an air outlet (not shown), thereby helping to transfer the thermal energy dissipated by the resistor system 310 to the outside of the helicopter 200. By directing the flow of heated air (i.e., the dissipated thermal energy) away from the resistor system 310 in such a manner, the components of the aircraft thermal management system 250 may be used to transfer the thermal energy generated by the electric motors 241 (i.e., the thermal energy dissipated by the resistor system 310) to the outside of the helicopter 200 and may also facilitate a cooling of the resistor system 310.

In one implementation, the computing system 340 may receive one or more user inputs indicating that the cabin temperature of the cabin section 211 is to be regulated, where the one or more user inputs may be received during and/or after the deceleration of the helicopter 200. In particular, the one or more user inputs may indicate that an atmosphere of the cabin section 211 is to be warmed using the aircraft thermal management system 250. The one or more user inputs may be provided by one or more human pilots and/or one or more human passengers using one or more input devices of the computing system 340. The one or more user inputs may be any type of user input known to those skilled in the art, including, but not limited to, the activation of an electronic button, a contact input on a touch sensitive panel, and/or the like.

After receiving the one or more user inputs, the computing system 340 may receive and analyze measurements from the resistor temperature sensor 330 and the cabin temperature sensor 370. In particular, the computing system 340 may compare one or more measurements from the resistor temperature sensor 330 with one or more measurements from the cabin temperature sensor 370.

If the comparison indicates that the resistor temperature is greater than the cabin temperature, then the computing system 340 may enable a cabin heating mode for the aircraft thermal management system 250. In the cabin heating mode, the aircraft thermal management system 250 may be configured to help warm an atmosphere of the cabin section 211 (not shown), including the cabin. In particular, in the cabin heating mode, the computing system 340 may adjust the valve 350 so that, after receiving the flow of heated air (i.e., the dissipated thermal energy) via the resistor system 310 and the fan 320, the valve 350 may direct the flow of heated air to the air outlet 360. The computing system 340 may adjust the valve 350 by controlling the one or more actuators of the valve 350. In some implementations, the computing system 340 may increase the fan speed of the fan 320 so that the valve 350 receives an increased flow of the heated air. The air outlet 360 may receive the heated air via the valve 350, and the heated air may then pass through the air outlet 360 to one or more openings 361 of the air outlet 360. The cabin section 211 may then receive the heated air (i.e., the thermal energy dissipated by the resistor system 310) via the one or more openings 361.

Given that the measurements from the resistor temperature sensor 330 and the cabin temperature sensor 370 indicate that the resistor temperature is greater than the cabin temperature, the heated air (i.e., the thermal energy dissipated by the resistor system 310) may be warmer than the atmosphere of the cabin section 211. Thus, the heated air (i.e., the thermal energy dissipated by the resistor system 310) received from the air outlet 360 may help to warm the atmosphere of the cabin section 211 (including the cabin). Accordingly, in the cabin heating mode, the aircraft thermal management system 250 may help to warm the atmosphere of the cabin section 211 by transferring thermal energy generated by the electric motors 241 (i.e., the thermal energy dissipated by the resistor system 310) to the cabin section 211. In such an implementation, the electric motors 241 may serve as a heat source for the cabin section 211.

Conversely, if the comparison of measurements indicates that the resistor temperature is less than or equal to the cabin temperature, then the aircraft thermal management system 250 may be unable to warm the atmosphere of the cabin section 211 using the heated air (i.e., the thermal energy dissipated by the resistor system 310). Consequently, despite the one or more user inputs indicating that the atmosphere of the cabin section 211 is to be warmed, the computing system 340 may not enable the cabin heating mode for the aircraft thermal management system 250. In particular, the computing system 340 may not allow the aircraft thermal management system 250 to transfer the flow of heated air (i.e., the thermal energy dissipated by the resistor system 310) to the cabin section 211. Instead, the computing system 340 may control the one or more actuators of the valve 350 so that the valve 350 may continue to direct the flow of the heated air to the exterior of the helicopter 200. Accordingly, in such a scenario, the computing system 340 may not allow the aircraft thermal management system 250 to warm the atmosphere of the cabin section 211 via the transfer of thermal energy generated by the electric motors 241 (i.e., the thermal energy dissipated by the resistor system 310) to the cabin section 211.

Other implementations for the one or more user inputs mentioned above may also be used. In one such implementation, after a period of time from when the computing system 340 has enabled the cabin heating mode, the computing system 340 may receive one or more additional user inputs indicating that the cabin temperature of the cabin section 211 is to no longer be regulated. For example, the one or more additional user inputs may indicate that the atmosphere of the cabin section 211 is to no longer be warmed using the aircraft thermal management system 250. In such an implementation, the computing system 340 may disable the cabin heating mode for the aircraft thermal management system 250, such that the aircraft thermal management system 250 halts the transfer of thermal energy generated by the electric motors 241 (i.e., the thermal energy dissipated by the resistor system 310) to the cabin section 211. Instead, the computing system 340 may control the one or more actuators of the valve 350 so that the valve 350 may direct the flow of the heated air (i.e., the thermal energy dissipated by the resistor system 310) to the exterior of the helicopter 200.

In another such implementation, the one or more user inputs received by the computing system 340 may indicate a minimum cabin temperature level for the cabin temperature, where the aircraft thermal management system 250 is to warm an atmosphere of the cabin section 211 if a measurement from the cabin temperature sensor 370 indicates that the cabin temperature is less than the minimum cabin temperature level. For example, a human pilot may provide contact inputs on a touch sensitive panel that indicate that the minimum cabin temperature level is 20 degrees Celsius. If the computing system 340 receives a measurement from the cabin temperature sensor 370 indicating that the cabin temperature is less than 20 degrees Celsius, then the computing system 340 may proceed with comparing measurements from the resistor temperature sensor 330 and the cabin temperature sensor 370. The computing system 340 may then enable or not enable the cabin heating mode for the aircraft thermal management system 250 based on the comparison, as described above.

Conversely, if the computing system 340 receives a measurement from the cabin temperature sensor 370 indicating that the cabin temperature is greater than or equal to the minimum cabin temperature level, then the computing system 340 may not enable the cabin heating mode for the aircraft thermal management system 250, as described above. Instead, the computing system 340 may control the one or more actuators of the valve 350 so that the valve 350 may direct the flow of the heated air (i.e., the thermal energy dissipated by the resistor system 310) to the exterior of the helicopter 200.

In another implementation, the computing system 340 may continuously monitor measurements from the cabin temperature sensor 370. For example, as described above, the computing system 340 may continuously monitor measurements from the cabin temperature sensor 370 after enabling the cabin heating mode based on the comparison of the cabin temperature with the minimum cabin temperature level. If the cabin temperature changes over time such that the cabin temperature becomes greater than or equal to the minimum cabin temperature level, then the computing system 340 may disable the cabin heating mode for the aircraft thermal management system 250, as described above. In particular, the computing system 340 may control the one or more actuators of the valve 350 so that the valve 350 may direct the flow of the heated air (i.e., the thermal energy dissipated by the resistor system 310) to the exterior of the helicopter 200. In another example, after not enabling the cabin heating mode based on a comparison of the cabin temperature with the resistor temperature, as described above, the computing system 340 may continuously monitor measurements from the cabin temperature sensor 370 and the resistor temperature sensor 330. If the resistor temperature and/or the cabin temperature change over time such that the resistor temperature becomes greater than the cabin temperature, then the computing system 340 may proceed to enable the cabin heating mode for the aircraft thermal management system 250, as described above.

As noted above, the aircraft thermal management system 250 may, along with the resistor system, include any components known to those skilled in the art that can be used to transfer thermal energy generated by the electric motors 241 to the cabin section 211. Accordingly, the components of the aircraft thermal management system 250 are not limited to the types and/or configurations described above.

2. Battery Section

With respect to FIG. 2, the fuselage 210 of the helicopter 200 may include a battery section (not shown). The battery section may include an area of the fuselage 210 in which a battery pack is disposed. As is known in the art, a battery pack may be used to provide electric power to one or more electric motors and/or other electric components of an electric aircraft.

The term "battery pack" may refer to one or more individual batteries contained within a single piece or multi-piece housing, where the individual batteries are electrically interconnected to achieve a desired voltage and capacity for a particular application. The terms "battery," "cell," and "battery cell" may be used interchangeably and may refer to any of a variety of different cell types, chemistries, and configurations, including, but not limited to, lithium ion, lithium iron phosphate, lithium manganese oxide, lithium copper oxide, lithium chromium oxide, lithium cobalt oxide, lithium carbon fluoride, lithium iron disulfide, lithium ion polymer, zinc-carbon, zinc-chloride, alkaline, zinc manganese dioxide, nickel oxyhydroxide, a bio-battery, mercury oxide, zinc-air, silver-oxide, magnesium, a Zamboni pile, nickel cadmium, nickel hydrogen, nickel metal hydride, nickel zinc, silver zinc, lead-acid, a solid state battery, and any other battery type or configuration known to those skilled in the art. Those skilled in the art will understand that some electric aircraft do not use a battery pack and, thus, may receive electric power using one or more other sources.

With respect to FIG. 2, the battery section may be located anywhere in the fuselage 210 of the helicopter 200. For example, the battery section may be disposed in or may be proximate to a bottom portion of the fuselage 210, such that the battery pack of the battery section may be disposed on a floor of the fuselage 210. The battery pack may be of any size and/or weight that can be accommodated by the helicopter 200. Further, the battery pack may be composed of any number of cells arranged in any type of configuration known to those skilled in the art. In addition, while various implementations for the aircraft thermal management system 250 are described below with respect to a battery section having a single battery pack, those skilled in the art will understand that the aircraft thermal management system 250 can be implemented with a battery section having multiple battery packs.

As is known in the art, the performance and/or lifetime of the battery pack can change depending on a temperature at which the battery pack is operating. This operating temperature may hereinafter be referred to as a battery temperature. In some scenarios, a battery pack of the helicopter 200 may have a minimum battery temperature level, such that the battery pack may offer reduced power or performance if its battery temperature is less than this minimum battery temperature level. Accordingly, during an operation of the helicopter 200, the battery pack of the helicopter 200 may offer an acceptable level of power or performance if its battery temperature is greater than or equal to the minimum battery temperature level. The minimum battery temperature level for a particular battery pack may depend on any number of factors, such as battery chemistry, regulations, guidelines, and/or the like. In one example, the battery pack of the helicopter 200 may have a minimum battery temperature level of about 10 degrees Celsius.

In view of the above, in one implementation, the aircraft thermal management system 250 may be used to regulate a battery temperature of the battery pack. In such an implementation, the aircraft thermal management system 250 may use a resistor system (not shown) to transfer thermal energy to the battery section of the helicopter 200, where the thermal energy may have been generated by the electric motors 241 in response to a deceleration of the helicopter 200. In particular, the aircraft thermal management system 250 may transfer the thermal energy to the battery section in order to maintain the battery temperature of the battery pack to a level that is greater than or equal to its minimum battery temperature level.

Figure 5:
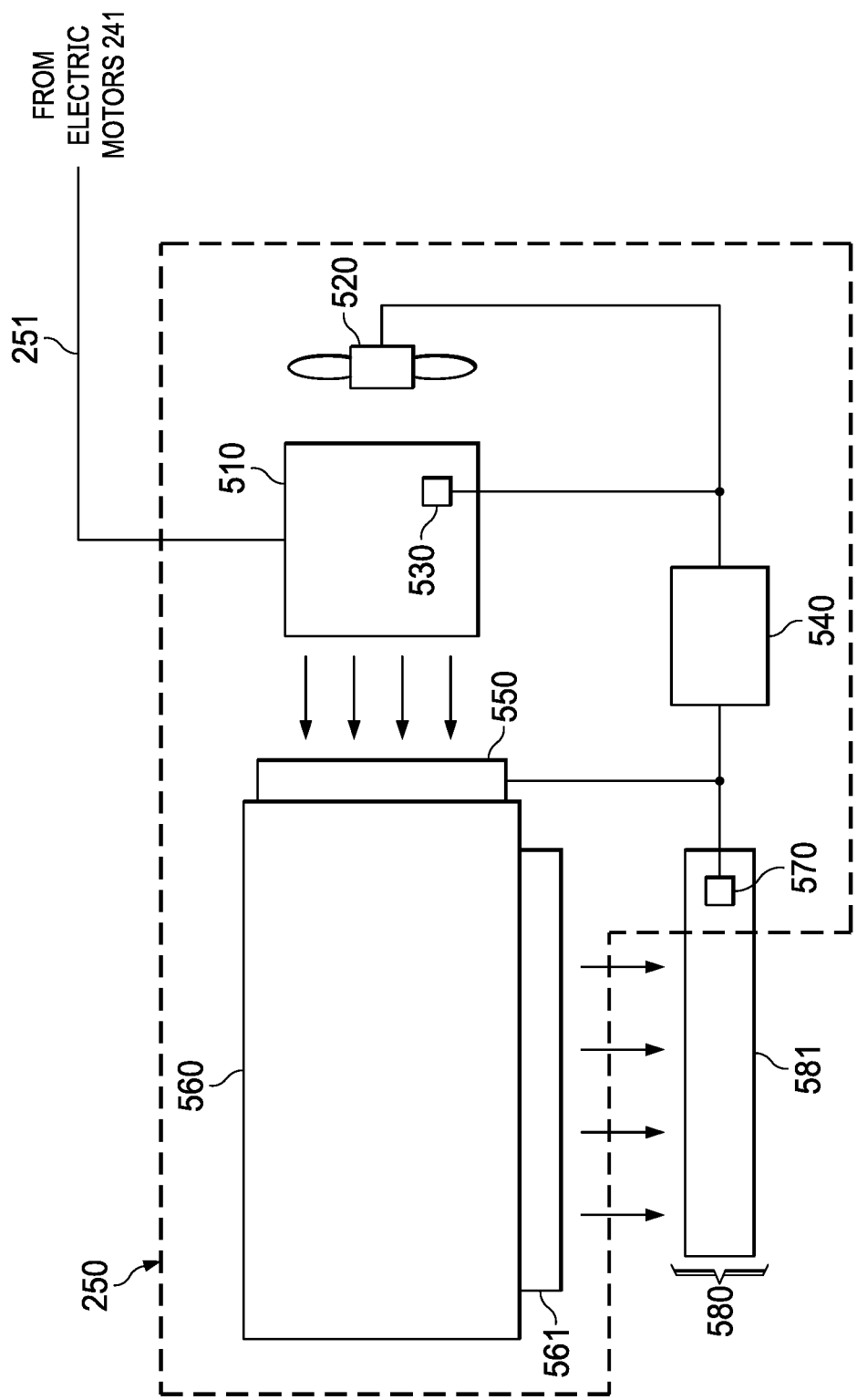
FIGS. 5-8 illustrate a schematic diagram of an aircraft thermal management system in accordance with implementations of various techniques described herein.

The aircraft thermal management system 250 may, along with the resistor system, include any components known to those skilled in the art that can be used to transfer the thermal energy to the battery section. For example, FIG. 5 illustrates a schematic diagram of the aircraft thermal management system 250 in accordance with implementations of various techniques described herein, where the aircraft thermal management system 250 includes a resistor system 510. As shown in FIG. 5, the aircraft thermal management system 250 may also include the one or more connections 251, a fan 520, a resistor temperature sensor 530, a computing system 540, a valve 550, an air outlet 560, and a battery temperature sensor 570. As noted above, the aircraft thermal management system 250 may be disposed in the fuselage 210 (not shown).

The aircraft thermal management system 250 may use the resistor system 510 to transfer thermal energy to a battery section 580 of the helicopter 200, where the thermal energy may have been generated by the electric motors 241 (not shown) in response to a deceleration of the helicopter 200. As explained above, the battery section 580 may be disposed in or may be proximate to a bottom portion of the fuselage 210, where the battery section 580 may contain a battery pack 581. The battery pack 581 may be any battery pack known in the art, including the implementations described earlier. In a further implementation, one or more components of the aircraft thermal management system 250 may be disposed within and/or proximate to the battery section 580, where such components may include the battery temperature sensor 570.

The resistor system 510 may be the same as the resistor system 310 described earlier. In particular, the resistor system 510 may be used to dissipate regenerated energy as heat (i.e., thermal energy) in response to a deceleration of the helicopter 200 (not shown). Similarly, the one or more connections 251 may be the same as those described earlier with respect to FIGS. 3-4. For example, as shown in FIG. 5, the one or more connections 251 may be a busbar coupled to the resistor system 510 and to the electric motors 241 (not shown). In addition, the fan 520 may be the same as the fan 320 described earlier. In particular, the fan 520 may be configured to circulate heated air (i.e., the dissipated thermal energy) away from the resistor system 510 during and/or after a deceleration of the helicopter 200.

The valve 550 and the air outlet 560 may be used to transfer the thermal energy dissipated by the resistor system 510 to the battery section 580 and, thus, the battery pack 581. In particular, the fan 520 may be configured to circulate the heated air (i.e., the dissipated thermal energy) away from the resistor system 510 and toward the valve 550. Thus, the valve 550 may be configured to receive a flow of the heated air via the resistor system 510 and the fan 520. In some instances, the valve 550 may then be used to direct this flow of heated air to the air outlet 560. The valve 550 may be any valve known to those skilled in the art, including, but not limited to, a damper valve. In a further implementation, the valve 550 may be controlled using one or more actuators (not shown).

The air outlet 560 may be configured to receive the flow of heated air via the valve 550, such that the heated air may pass through the air outlet 560 and to the battery section 580 via one or more openings 561 of the air outlet 560. The air outlet 560 may include any outlet known to those skilled in the art, including, but not limited to, one or more air ducts, one or more air pipelines, and/or the like. In some implementations, the air outlet 560 may be a component of an HVAC system (not shown) of the helicopter 200. Those skilled in the art will understand that the air outlet 560 and its one or more openings 561 are not limited to the configuration shown in FIG. 5. In particular, the air outlet 560 may be of any size or shape. For example, the air outlet 560 may extend the length of the battery section 580. Further, the air outlet 560 may include any number of openings 561 configured to transfer the flow of heated air to the battery section 580, where the openings 561 may be configured to transfer the flow of heated air to the battery pack 581 from the valve 550. For example, the air outlet 560 may include an opening 561 that is positioned directly above and/or proximate to the battery pack 581.

Thus, the fan 520, the valve 550, and the air outlet 560 may be used together to direct the heated air (i.e., the thermal energy dissipated by the resistor system 510) to the battery section 580, thereby helping to transfer the thermal energy dissipated by the resistor system 510 to the battery section 580. As a result, the battery section 580 and its battery pack

581 may be warmed by the heated air (i.e., the thermal energy dissipated by the resistor system 510). In a further implementation, the valve 550 may be adjusted so that it may instead direct the flow of heated air (i.e., the thermal energy dissipated by the resistor system 510) to an exterior of the helicopter 200 using a different air outlet (not shown), thereby helping to transfer the thermal energy dissipated by the resistor system 510 away from the battery section 580 and to the outside of the helicopter 200. In such an implementation, the valve 550 may be adjusted by controlling one or more of its actuators.

The resistor temperature sensor 530 may be the same as the resistor temperature sensor 330 described earlier. The battery temperature sensor 570 may be positioned on, in, or proximate to the battery pack 581, such that the battery temperature sensor 570 may be used to measure the battery temperature of the battery pack 581. Any sensor known to those skilled in the art may be used for the battery temperature sensor 570.

The computing system 540 may be used to control the aircraft thermal management system 250, such as by communicating with one or more components of the aircraft thermal management system 250. In one implementation, the computing system 540 may be in communication with the fan 520, the valve 550, the resistor temperature sensor 530, and/or the battery temperature sensor 570. In such an implementation, the computing system 540 may be used to control the operation of the fan 520, such as by controlling a fan speed and/or whether the fan 520 is operational. In another implementation, the computing system 540 may be used to control one or more actuators of the valve 550, such that the computing system 540 may control a direction of the flow of heated air received by the valve 550 (e.g., whether the heated air is directed to the air outlet 560 or to an exterior of the helicopter 200). In yet another implementation, the computing system 540 may be configured to receive one or more measurements from the resistor temperature sensor 530 and/or the battery temperature sensor 570. The computing system 540 may also be in communication with and/or used to control other components of the helicopter 200, such as the main rotor system 220 (not shown), the tail rotor system 240 (not shown), a battery management system, one or more other onboard electric components, and/or one or more other onboard computing systems.

The computing system 540 may communicate with one or more components of the aircraft thermal management system 250 and/or with other components of the helicopter 200 using any type of communication (e.g., wired and/or wireless) known to those skilled in the art. As similarly explained above, at least a portion of the computing system 540 may be disposed within and/or proximate to the cabin section 211 (not shown), including, but not limited to, the one or more input devices and/or the one or more output devices described above. The computing system 540 is described in further detail in a later section.

In operation, the aircraft thermal management system 250 may use the above-described components to transfer thermal energy to the battery section 580, where the thermal energy may have been generated by the electric motors 241 in response to a deceleration of the helicopter 200. In doing so, the aircraft thermal management system 250 may use the above-described components to regulate the battery temperature of the battery pack 581. In one implementation, the aircraft thermal management system 250 may use the above-described components to maintain the battery temperature of the battery pack 581 to a level that is greater than or equal to its minimum battery temperature level.

Initially, the computing system 540 may receive one or more user inputs indicating the minimum battery temperature level for the battery pack 581. In some implementations, the computing system 540 may receive these one or more user inputs prior to takeoff of the helicopter 200. The one or more user inputs may be provided by one or more human pilots and/or one or more human passengers using one or more input devices of the computing system 540. The one or more user inputs may be any type of user input known to those skilled in the art, including, but not limited to, input provided via keyboard, a contact input on a touch sensitive panel, and/or the like.

After takeoff of the helicopter 200, the aircraft thermal management system 250 may use the above-described components to facilitate a cooling of the resistor system 510 during and/or after a deceleration of the helicopter 200, such as to prevent an overheating of the resistor system 510. In particular, during and/or after the deceleration, the computing system 540 may control the fan 520 so that it may circulate the heated air (i.e., the dissipated thermal energy) away from resistor system 510 and toward the valve 550. Thus, the valve 550 may receive a flow of the heated air via the resistor system 510 and the fan 520. The computing system 540 may control one or more actuators of the valve 550 so that the valve 550 may direct the flow of heated air to an exterior of the helicopter 200 using an air outlet (not shown), thereby helping to transfer the thermal energy dissipated by the resistor system 510 to the outside of the helicopter 200. By directing the flow of heated air (i.e., the dissipated thermal energy) away from the resistor system 510 in such a manner, the components of the aircraft thermal management system 250 may be used to transfer the thermal energy generated by the electric motors 241 (i.e., the thermal energy dissipated by the resistor system 510) to the outside of the helicopter 200 and may also facilitate a cooling of the resistor system 510.

In one implementation, while the helicopter 200 is in operation, the computing system 540 may monitor the battery temperature of the battery pack 581. In particular, the computing system 540 may receive and analyze measurements from the battery temperature sensor 570. In such an implementation, the computing system 540 may compare one or more measurements from the battery temperature sensor 570 with the minimum battery temperature level received earlier.

In one such implementation, if the computing system 540 receives a measurement from the battery temperature sensor 570 indicating that the battery temperature is less than the minimum battery temperature level, then the computing system 540 may receive and analyze measurements from the resistor temperature sensor 530 and the battery temperature sensor 570 to determine if the computing system 540 can enable a battery heating mode for the aircraft thermal management system 250. In particular, the computing system 540 may compare one or more measurements from the resistor temperature sensor 530 with one or more measurements from the battery temperature sensor 570.

If the comparison indicates that the resistor temperature is greater than the battery temperature, then the computing system 540 may enable the battery heating mode for the aircraft thermal management system 250. In the battery heating mode, the aircraft thermal management system 250 may be configured to help warm an atmosphere of the battery section 580 and, in turn, the battery pack 581. In particular, in the battery heating mode, the computing system 540 may adjust the valve 550 so that, after receiving the flow of heated air (i.e., the thermal energy dissipated by the resistor system 510), the valve 550 may direct the flow of heated air to the air outlet 560. The computing system 540 may adjust the valve 550 by controlling the one or more actuators of the valve 550. In some implementations, the computing system 540 may increase the fan speed of the fan 520 so that the valve 550 receives an increased flow of heated air. The air outlet 560 may receive the heated air via the valve 550, and the heated air may then pass through the air outlet 560 to one or more openings 561 of the air outlet 560. The battery section 580 may then receive the heated air (i.e., the thermal energy dissipated by the resistor system 510) via the one or more openings 561.

Given that the measurements from the resistor temperature sensor 530 and the battery temperature sensor 570 indicate that the resistor temperature is greater than the battery temperature, the heated air (i.e., the thermal energy dissipated by the resistor system 510) may be warmer than the atmosphere of the battery section 580. Thus, the heated air (i.e., the thermal energy dissipated by the resistor system 510) received from the air outlet 560 may help to warm the atmosphere of the battery section 580 and, in turn, the battery pack 581. Accordingly, in the battery heating mode, the aircraft thermal management system 250 may help to warm the battery pack 581 by transferring thermal energy generated by the electric motors 241 (i.e., the thermal energy dissipated by the resistor system 510) to the battery section 580. In such an implementation, the electric motors 241 may serve as a heat source for the battery section 580 and, in turn, the battery pack 581.

Conversely, if the comparison of measurements indicates that the resistor temperature is less than or equal to the battery temperature, then the aircraft thermal management system 250 may be unable to warm the atmosphere of the battery section 580 (along with the battery pack 581) using the heated air (i.e., the thermal energy dissipated by the resistor system 510). Consequently, the computing system 540 may not enable the battery heating mode for the aircraft thermal management system 250. In particular, the computing system 540 may not allow the aircraft thermal management system 250 to transfer the flow of heated air (i.e., the thermal energy dissipated by the resistor system 510) to the battery section 580. Instead, the computing system 540 may control the one or more actuators of the valve 550 so that the valve 550 may continue to direct the flow of the heated air to the exterior of the helicopter 200. Accordingly, in such a scenario, the computing system 540 may not allow the aircraft thermal management system 250 to warm the atmosphere of the battery section 580 (along with the battery pack 581) via the transfer of thermal energy generated by the electric motors 241 (i.e., the thermal energy dissipated by the resistor system 510) to the battery section 580.

In another implementation, if the computing system 540 receives a measurement from the battery temperature sensor 570 indicating that the battery temperature is greater than or equal to the minimum battery temperature level, then the computing system 540 may not enable the battery heating mode for the aircraft thermal management system 250, as described above. Instead, the computing system 540 may control the one or more actuators of the valve 550 so that the valve 550 may continue to direct the flow of the heated air (i.e., the thermal energy dissipated by the resistor system 510) to the exterior of the helicopter 200.

In yet another implementation, the computing system 540 may continuously monitor measurements from the battery temperature sensor 570. For example, as described above, the computing system 540 may continuously monitor measurements from the battery temperature sensor 570 after enabling the battery heating mode based on the comparison of the battery temperature with the minimum battery temperature level. If the battery temperature changes over time such that the battery temperature becomes greater than or equal to the minimum battery temperature level, then the computing system 540 may disable the battery heating mode for the aircraft thermal management system 250, such that the aircraft thermal management system 250 halts the transfer of thermal energy generated by the electric motors 241 (i.e., the thermal energy dissipated by the resistor system 510) to the battery section 580. Instead, the computing system 540 may control the one or more actuators of the valve 550 so that the valve 550 may direct the flow of the heated air (i.e., the thermal energy dissipated by the resistor system 510) to the exterior of the helicopter 200. In another example, after not enabling the battery heating mode based on a comparison of the battery temperature with the resistor temperature, as described above, the computing system 540 may continuously monitor measurements from the resistor temperature sensor 530 and the battery temperature sensor 570. If the resistor temperature and/or the battery temperature change over time such that the resistor temperature becomes greater than the battery temperature, then the computing system 540 may proceed to enable the battery heating mode for the aircraft thermal management system 250, as described above.

As noted above, the aircraft thermal management system 250 may, along with the resistor system, include any components known to those skilled in the art that can be used to transfer thermal energy generated by the electric motors 241 to the battery section 580. Accordingly, the components of the aircraft thermal management system 250 are not limited to the types and/or configurations described above.

3. Airframe Section

In one implementation, the aircraft thermal management system 250 of FIG. 2 may use a resistor system (not shown) to transfer thermal energy to an airframe section (not shown) of the fuselage 210, where the thermal energy may have been generated by the electric motors 241 in response to a deceleration of the helicopter 200. The airframe section may include the main structural portion of the fuselage 210, where the main structural portion may include components such as an interior surface and/or an exterior surface of the fuselage 210.

In some implementations, the aircraft thermal management system 250 may be used to regulate a temperature of the airframe section of the fuselage 210. The temperature of the airframe section may hereinafter be referred to as an airframe temperature. In one implementation, the aircraft thermal management system 250 may be used to regulate the airframe temperature in order to perform a de-icing operation on the fuselage 210. As is known in the art, a de-icing operation of a fuselage may refer to the process of removing snow, ice, and/or frost from an exterior surface of the fuselage. While various implementations for the aircraft thermal management system 250 are described herein with respect to regulating the airframe temperature of the fuselage 210, those skilled in the art will understand that the aircraft thermal management systems disclosed herein can be implemented to regulate one or more temperatures of one or more other components of an electric aircraft (e.g., a tail member), such as for one or more de-icing operations.

Figure 6:
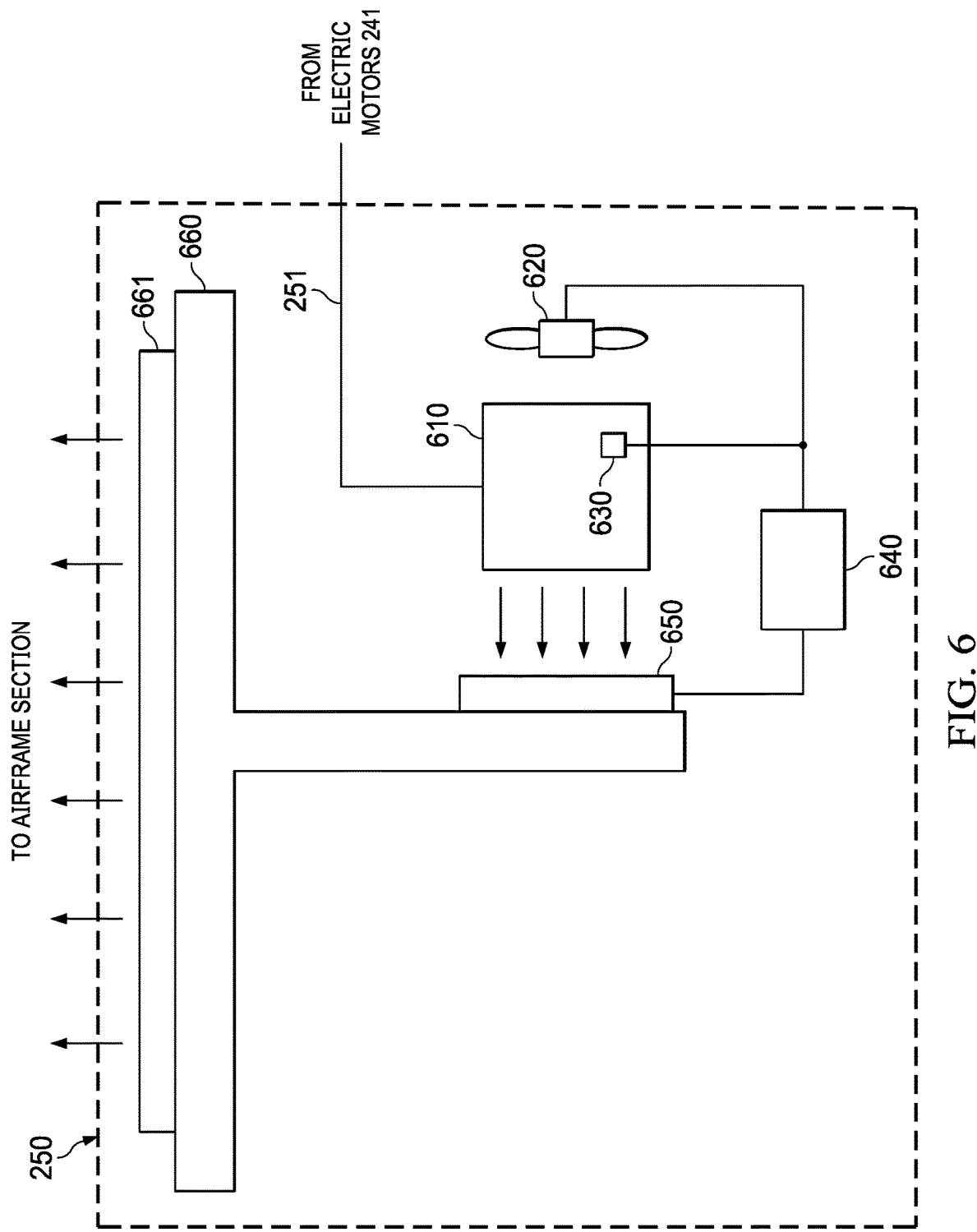

The aircraft thermal management system 250 may, along with the resistor system, include any components known to those skilled in the art that can be used to transfer the thermal energy to the airframe section. For example, FIG. 6 illustrates a schematic diagram of the aircraft thermal management system 250 in accordance with implementations of various techniques described herein, where the aircraft thermal management system 250 includes a resistor system 610. As shown in FIG. 6, the aircraft thermal management system 250 may also include the one or more connections 251, a fan 620, a resistor temperature sensor 630, a computing system 640, a valve 650, and an air outlet 660. As noted above, the aircraft thermal management system 250 may be disposed in the fuselage 210 (not shown).

The aircraft thermal management system 250 may use the resistor system 610 to transfer thermal energy to an airframe section (not shown) of the helicopter 200 (not shown), where the thermal energy may have been generated by the electric motors 241 (not shown) in response to a deceleration of the helicopter 200. The resistor system 610 may be the same as the resistor systems 310, 510 described earlier. In particular, the resistor system 610 may be used to dissipate regenerated energy as heat (i.e., the thermal energy) in response to a deceleration of the helicopter 200. Similarly, the one or more connections 251 may be the same as those described earlier with respect to FIGS. 3-5. For example, as shown in FIG. 6, the one or more connections 251 may be a busbar coupled to the resistor system 610 and to the electric motors 241 (not shown). In addition, the fan 620 may be the same as the fans 320, 520 described earlier. In particular, the fan 620 may be configured to circulate heated air (i.e., the dissipated thermal energy) away from the resistor system 610 during and/or after a deceleration of the helicopter 200. Further, the resistor temperature sensor 630 may be the same as the resistor temperature sensors 330, 530 described earlier.

The valve 650 and the air outlet 660 may be used to transfer the thermal energy dissipated by the resistor system 610 to the airframe section. In particular, the fan 620 may be configured to circulate the heated air (i.e., the dissipated thermal energy) away from the resistor system 610 and toward the valve 650. Thus, the valve 650 may be configured to receive a flow of the heated air via the resistor system 610 and the fan 620. In some instances, the valve 650 may then be used to direct this flow of heated air to the air outlet 660. The valve 650 may be any valve known to those skilled in the art, including, but not limited to, a damper valve. In a further implementation, the valve 650 may be controlled using one or more actuators (not shown).

The air outlet 660 may be configured to receive the flow of heated air via the valve 650, such that the heated air may pass through the air outlet 660 and to the airframe section via one or more openings 661 of the air outlet 660. The air outlet 660 may include any outlet known to those skilled in the art, including, but not limited to, one or more air ducts, one or more air pipelines, and/or the like. In some implementations, the air outlet 660 may be a component of an HVAC system (not shown) of the helicopter 200. The air outlet 660 may be of any size or shape. For example, the air outlet 660 may extend the length of the airframe section. Further, the air outlet 660 may include any number of openings 661 configured to transfer the flow of heated air to the airframe section, where the openings 661 may be disposed in and/or may be proximate to the airframe section at any number of locations.

Those skilled in the art will understand that a configuration of the aircraft thermal management system 250, including the air outlet 660 and its one or more openings 661, is not limited to the configuration shown in FIG. 6. For example, the air outlet 660 and/or one or more of its openings 661 may be positioned proximate to a front portion of the helicopter 200. In a further example, the resistor system 610, the fan 620, and/or the valve 650 may also be positioned proximate to the front portion of the helicopter 200.

Thus, the fan 620, the valve 650, and the air outlet 660 may be used together to direct the heated air (i.e., the thermal energy dissipated by the resistor system 610) to the airframe section, thereby helping to transfer the thermal energy dissipated by the resistor system 610 to the airframe section. As a result, the airframe section may be warmed by the heated air (i.e., the thermal energy dissipated by the resistor system 610). In some implementations, the heated air may be used to warm the interior surface and/or the exterior surface of the fuselage 210 for a de-icing operation. In a further implementation, the valve 650 may be adjusted so that it may instead direct the flow of heated air (i.e., the thermal energy dissipated by the resistor system 610) to an exterior of the helicopter 200 using a different air outlet (not shown), thereby helping to transfer the thermal energy dissipated by the resistor system 610 away from the airframe section and to the outside of the helicopter 200. In such an implementation, the valve 650 may be adjusted by controlling one or more of its actuators.

The computing system 640 may be used to control the aircraft thermal management system 250, such as by communicating with one or more components of the aircraft thermal management system 250. In one implementation, the computing system 640 may be in communication with the fan 620, the valve 650, and/or the resistor temperature sensor 630. In such an implementation, the computing system 640 may be used to control the operation of the fan 620, such as by controlling a fan speed and/or whether the fan 620 is operational. In another implementation, the computing system 640 may be used to control one or more actuators of the valve 650, such that the computing system 640 may control a direction of the flow of heated air received by the valve 650 (e.g., whether the heated air is directed to the air outlet 660 or to an exterior of the helicopter 200). In yet another implementation, the computing system 640 may be configured to receive one or more measurements from the resistor temperature sensor 630. The computing system 640 may also be in communication with and/or used to control other components of the helicopter 200, such as the main rotor system 220 (not shown), the tail rotor system 240 (not shown), one or more other onboard electric components, and/or one or more other onboard computing systems.

The computing system 640 may communicate with one or more components of the aircraft thermal management system 250 and/or with other components of the helicopter 200 using any type of communication (e.g., wired and/or wireless) known to those skilled in the art. As similarly explained above, at least a portion of the computing system 640 may be disposed within and/or proximate to the cabin section 211 (not shown), including, but not limited to, the one or more input devices and/or the one or more output devices described above. The computing system 640 is described in further detail in a later section.

In operation, the aircraft thermal management system 250 may use the above-described components to transfer thermal energy to the airframe section, where the thermal energy may have been generated by the electric motors 241 in response to a deceleration of the helicopter 200. In particular, the aircraft thermal management system 250 may use the above-described components to regulate the airframe temperature of the airframe section. In one implementation, the aircraft thermal management system 250 may regulate the airframe temperature in order to perform a de-icing operation on the fuselage 210.

Initially, such as after a takeoff of the helicopter 200, the aircraft thermal management system 250 may use the above-described components to facilitate a cooling of the resistor system 610 during and/or after a deceleration of the helicopter 200, such as to prevent an overheating of the resistor system 610. In particular, during and/or after the deceleration, the computing system 640 may control the fan 620 so that it may circulate the heated air (i.e., the dissipated thermal energy) away from resistor system 610 and toward the valve 650. Thus, the valve 650 may receive a flow of the heated air via the resistor system 610 and the fan 620. The computing system 640 may control one or more actuators of the valve 650 so that the valve 650 may direct the flow of heated air to an exterior of the helicopter 200 using an air outlet (not shown), thereby helping to transfer the thermal energy dissipated by the resistor system 610 to the outside of the helicopter 200. By directing the flow of heated air (i.e., the dissipated thermal energy) away from the resistor system 610 in such a manner, the components of the aircraft thermal management system 250 may be used to transfer the thermal energy generated by the electric motors 241 (i.e., the thermal energy dissipated by the resistor system 610) to the outside of the helicopter 200 and may also facilitate a cooling of the resistor system 610.

In one implementation, the computing system 640 may receive one or more user inputs indicating that the airframe temperature of the airframe section is to be regulated, where the one or more user inputs may be received during and/or after the deceleration of the helicopter 200. In particular, the one or more user inputs may indicate that the airframe section is to be warmed using the aircraft thermal management system 250. The one or more user inputs may be provided by one or more human pilots and/or one or more human passengers using one or more input devices of the computing system 640. The one or more user inputs may be any type of user input known to those skilled in the art, including, but not limited to, the activation of an electronic button, a contact input on a touch sensitive panel, and/or the like.

In response to the one or more user inputs, the computing system 640 may enable an airframe heating mode for the aircraft thermal management system 250. In the airframe heating mode, the aircraft thermal management system 250 may be configured to help warm the airframe section (not shown). In particular, in the airframe heating mode, the computing system 640 may adjust the valve 650 so that, after receiving the flow of heated air (i.e., the dissipated thermal energy) via the resistor system 610 and the fan 620, the valve 650 may direct the flow of heated air to the air outlet 660. The computing system 640 may adjust the valve 650 by controlling the one or more actuators of the valve 650. In some implementations, the computing system 640 may increase the fan speed of the fan 620 so that the valve 650 receives an increased flow of the heated air. The air outlet 660 may receive the heated air via the valve 650, and the heated air may then pass through the air outlet 660 to one or more openings 661 of the air outlet 660. The airframe section may then receive the heated air (i.e., the thermal energy dissipated by the resistor system 610) via the one or more openings 661. As a result, the airframe section may be warmed by the heated air (i.e., the thermal energy dissipated by the resistor system 610). In some implementations, the heated air transferred via the one or more openings 661 may be used to warm the interior surface and/or the exterior surface of the fuselage 210 for a de-icing operation.

Accordingly, in the airframe heating mode, the aircraft thermal management system 250 may help to warm the airframe section by transferring thermal energy generated by the electric motors 241 (i.e., the thermal energy dissipated by the resistor system 610) to the airframe section. In such an implementation, the electric motors 241 may serve as a heat source for the airframe section.

In a further implementation, after a period of time from when the computing system 640 has enabled the airframe heating mode, the computing system 640 may receive one or more additional user inputs indicating that the airframe temperature of the airframe section is to no longer be regulated. For example, the one or more additional user inputs may indicate that the airframe section is to no longer be warmed using the aircraft thermal management system 250. In such an implementation, the computing system 640 may disable the airframe heating mode for the aircraft thermal management system 250, such that the aircraft thermal management system 250 halts the transfer of thermal energy generated by the electric motors 241 (i.e., the thermal energy dissipated by the resistor system 610) to the airframe section. Instead, the computing system 640 may control the one or more actuators of the valve 650 so that the valve 650 may direct the flow of the heated air (i.e., the thermal energy dissipated by the resistor system 610) to the exterior of the helicopter 200.

As noted above, the aircraft thermal management system 250 may, along with the resistor system, include any components known to those skilled in the art that can be used to transfer thermal energy generated by the electric motors 241 to the airframe section. Accordingly, the components of the aircraft thermal management system 250 are not limited to the types and/or configurations described above.

4. Window Section

In one implementation, the aircraft thermal management system 250 of FIG. 2 may use a resistor system (not shown) to transfer thermal energy to the window section 212 of the fuselage 210, where the thermal energy may have been generated by the electric motors 241 in response to a deceleration of the helicopter 200. The window section 212 may include an area of the fuselage 210 in which one or more windows of the helicopter 200 are disposed. The one or more windows may be configured to provide visibility to one or more human pilots and/or one or more human passengers. The one or more windows may include a windshield and may also include one or more other types of windows (e.g., side windows).

In some implementations, the aircraft thermal management system 250 may be used to regulate a temperature of the window section 212. The temperature of the window section 212 may hereinafter be referred to as a window temperature. In one implementation, the aircraft thermal management system 250 may be used to regulate the window temperature in order to perform a de-icing operation on the one or more windows of the window section 212. As is known in the art, a de-icing operation of a window may refer to the process of removing snow, ice, and/or frost from an exterior surface of the window.

Figure 7:
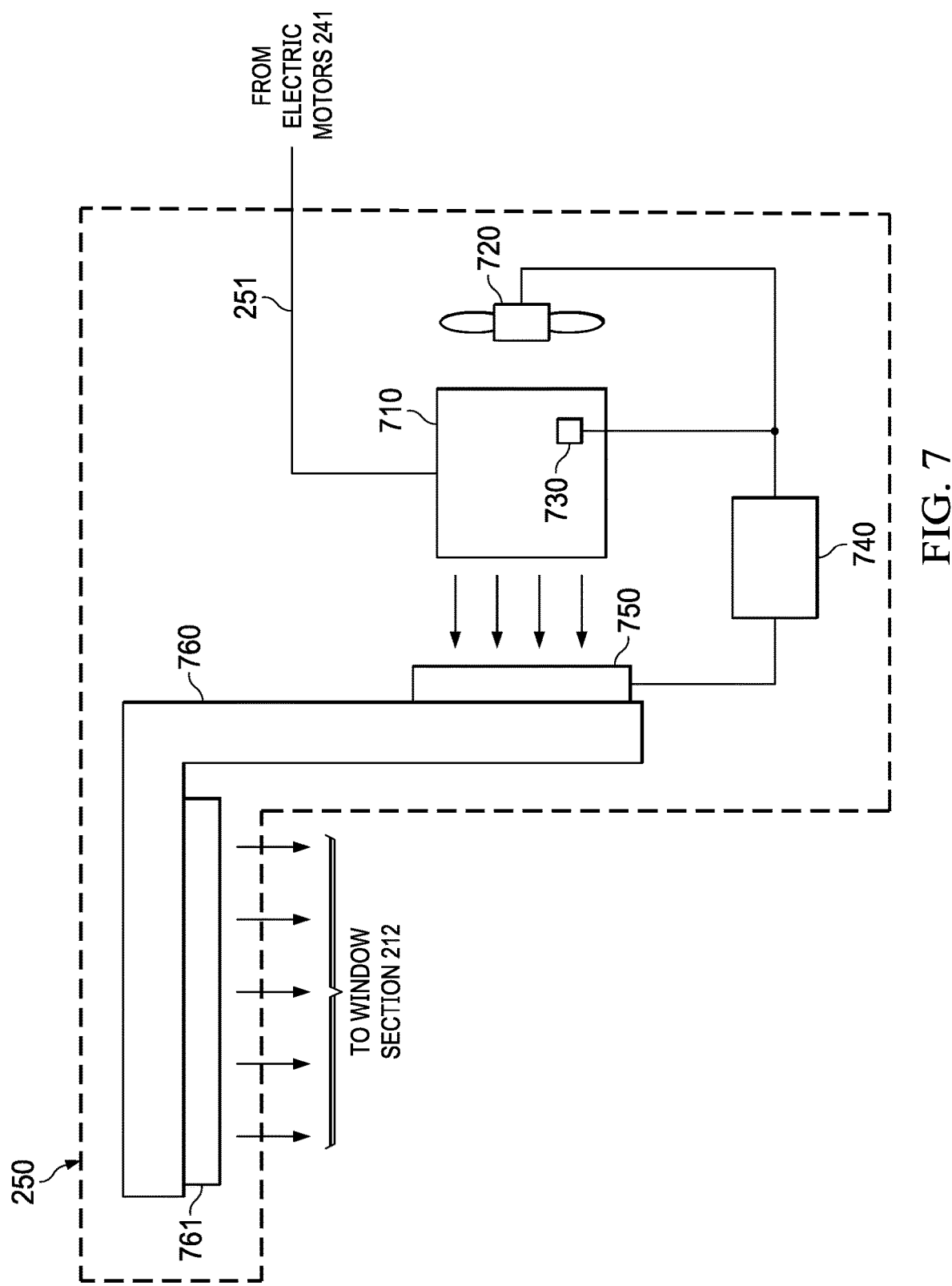

The aircraft thermal management system 250 may, along with the resistor system, include any components known to those skilled in the art that can be used to transfer the thermal energy to the window section 212. For example, FIG. 7 illustrates a schematic diagram of the aircraft thermal management system 250 in accordance with implementations of various techniques described herein, where the aircraft thermal management system 250 includes a resistor system 710. As shown in FIG. 7, the aircraft thermal management system 250 may also include the one or more connections 251, a fan 720, a resistor temperature sensor 730, a computing system 740, a valve 750, and an air outlet 760. As noted above, the aircraft thermal management system 250 may be disposed in the fuselage 210 (not shown).

The aircraft thermal management system 250 may use the resistor system 710 to transfer thermal energy to the window section 212 of the helicopter 200 (not shown), where the thermal energy may have been generated by the electric motors 241 (not shown) in response to a deceleration of the helicopter 200. The resistor system 710 may be the same as the resistor systems 310, 510, 610 described earlier. In particular, the resistor system 710 may be used to dissipate regenerated energy as heat (i.e., the thermal energy) in response to a deceleration of the helicopter 200 (not shown). Similarly, the one or more connections 251 may be the same as those described earlier with respect to FIGS. 3-6. For example, as shown in FIG. 7, the one or more connections 251 may be a busbar coupled to the resistor system 710 and to the electric motors 241 (not shown). In addition, the fan 720 may be the same as the fans 320, 520, 620 described earlier. In particular, the fan 720 may be configured to circulate heated air (i.e., the dissipated thermal energy) away from the resistor system 710 during and/or after a deceleration of the helicopter 200. Further, the resistor temperature sensor 730 may be the same as the resistor temperature sensors 330, 530, 630 described earlier.

The valve 750 and the air outlet 760 may be used to transfer the thermal energy dissipated by the resistor system 710 to the window section 212. In particular, the fan 720 may be configured to circulate the heated air (i.e., the dissipated thermal energy) away from the resistor system 710 and toward the valve 750. Thus, the valve 750 may be configured to receive a flow of the heated air via the resistor system 710 and the fan 720. In some instances, the valve 750 may then be used to direct this flow of heated air to the air outlet 760. The valve 750 may be any valve known to those skilled in the art, including, but not limited to, a damper valve. In a further implementation, the valve 750 may be controlled using one or more actuators (not shown).

The air outlet 760 may be configured to receive the flow of heated air via the valve 750, such that the heated air may pass through the air outlet 760 and to the window section 212 via one or more openings 761 of the air outlet 760. The air outlet 760 may include any outlet known to those skilled in the art, including, but not limited to, one or more air ducts, one or more air pipelines, and/or the like. In some implementations, the air outlet 760 may be a component of an HVAC system (not shown) of the helicopter 200. The air outlet 760 may be of any size or shape. For example, the air outlet 760 may extend the length of the window section 212. Further, the air outlet 760 may include any number of openings 761 configured to transfer the flow of heated air to the window section 212, where the openings 761 may be disposed in and/or may be proximate to the window section 212 at any number of locations.

Those skilled in the art will understand that a configuration of the aircraft thermal management system 250, including the air outlet 760 and its one or more openings 761, is not limited to the configuration shown in FIG. 7. For example, the air outlet 760 and/or one or more of its openings 761 may be positioned proximate to a front portion of the helicopter 200, such that the air outlet 760 and/or one or more of its openings 761 may be positioned above and/or below the windows of the window section 212. In a further example, the resistor system 710, the fan 720, and/or the valve 750 may also be positioned proximate to the front portion of the helicopter 200.

Thus, the fan 720, the valve 750, and the air outlet 760 may be used together to direct the heated air (i.e., the thermal energy dissipated by the resistor system 710) to the window section 212, thereby helping to transfer the thermal energy dissipated by the resistor system 710 to the window section 212. As a result, the window section 212 may be warmed by the heated air (i.e., the thermal energy dissipated by the resistor system 710). In some implementations, the heated air may be used to warm an interior surface and/or an exterior surface of one or more windows of the window section 212 for a de-icing operation. In a further implementation, the valve 750 may be adjusted so that it may instead direct the flow of heated air (i.e., the thermal energy dissipated by the resistor system 710) to an exterior of the helicopter 200 using a different air outlet (not shown), thereby helping to transfer the thermal energy dissipated by the resistor system 710 away from the window section 212 and to the outside of the helicopter 200. In such an implementation, the valve 750 may be adjusted by controlling one or more of its actuators.

The computing system 740 may be used to control the aircraft thermal management system 250, such as by communicating with one or more components of the aircraft thermal management system 250. In one implementation, the computing system 740 may be in communication with the fan 720, the valve 750, and/or the resistor temperature sensor 730. In such an implementation, the computing system 740 may be used to control the operation of the fan 720, such as by controlling a fan speed and/or whether the fan 720 is operational. In another implementation, the computing system 740 may be used to control one or more actuators of the valve 750, such that the computing system 740 may control a direction of the flow of heated air received by the valve 750 (e.g., whether the heated air is directed to the air outlet 760 or to an exterior of the helicopter 200). In yet another implementation, the computing system 740 may be configured to receive one or more measurements from the resistor temperature sensor 730. The computing system 740 may also be in communication with and/or used to control other components of the helicopter 200, such as the main rotor system 220 (not shown), the tail rotor system 240 (not shown), one or more other onboard electric components, and/or one or more other onboard computing systems.

The computing system 740 may communicate with one or more components of the aircraft thermal management system 250 and/or with other components of the helicopter 200 using any type of communication (e.g., wired and/or wireless) known to those skilled in the art. As similarly explained above, at least a portion of the computing system 740 may be disposed within and/or proximate to the cabin section 211 (not shown), including, but not limited to, the one or more input devices and/or the one or more output devices described above. The computing system 740 is described in further detail in a later section.

In operation, the aircraft thermal management system 250 may use the above-described components to transfer thermal energy to the window section 212, where the thermal energy may have been generated by the electric motors 241 in response to a deceleration of the helicopter 200. In particular, the aircraft thermal management system 250 may use the above-described components to regulate the window temperature of the window section 212. In one implementation, the aircraft thermal management system 250 may regulate the window temperature in order to perform a de-icing operation on the one or more windows of the window section 212.

Initially, such as after a takeoff of the helicopter 200, the aircraft thermal management system 250 may use the above-described components to facilitate a cooling of the resistor system 710 during and/or after a deceleration of the helicopter 200, such as to prevent an overheating of the resistor system 710. In particular, during and/or after the deceleration, the computing system 740 may control the fan 720 so that it may circulate the heated air (i.e., the dissipated thermal energy) away from resistor system 710 and toward the valve 750. Thus, the valve 750 may receive a flow of the heated air via the resistor system 710 and the fan 720. The computing system 740 may control one or more actuators of the valve 750 so that the valve 750 may direct the flow of heated air to an exterior of the helicopter 200 using an air outlet (not shown), thereby helping to transfer the thermal energy dissipated by the resistor system 710 to the outside of the helicopter 200. By directing the flow of heated air (i.e., the dissipated thermal energy) away from the resistor system 710 in such a manner, the components of the aircraft thermal management system 250 may be used to transfer the thermal energy generated by the electric motors 241 (i.e., the thermal energy dissipated by the resistor system 710) to the outside of the helicopter 200 and may also facilitate a cooling of the resistor system 710.

In one implementation, the computing system 740 may receive one or more user inputs indicating that the window temperature of the window section 212 is to be regulated, where the one or more user inputs may be received during and/or after the deceleration of the helicopter 200. In particular, the one or more user inputs may indicate that the window section 212 is to be warmed using the aircraft thermal management system 250. The one or more user inputs may be provided by one or more human pilots and/or one or more human passengers using one or more input devices of the computing system 740. The one or more user inputs may be any type of user input known to those skilled in the art, including, but not limited to, the activation of an electronic button, a contact input on a touch sensitive panel, and/or the like.

In response to the one or more user inputs, the computing system 740 may enable a window heating mode for the aircraft thermal management system 250. In the window heating mode, the aircraft thermal management system 250 may be configured to help warm the window section 212. In particular, in the window heating mode, the computing system 740 may adjust the valve 750 so that, after receiving the flow of heated air (i.e., the dissipated thermal energy) via the resistor system 710 and the fan 720, the valve 750 may direct the flow of heated air to the air outlet 760. The computing system 740 may adjust the valve 750 by controlling the one or more actuators of the valve 750. In some implementations, the computing system 740 may increase the fan speed of the fan 720 so that the valve 750 receives an increased flow of the heated air. The air outlet 760 may receive the heated air via the valve 750, and the heated air may then pass through the air outlet 760 to one or more openings 761 of the air outlet 760. The window section 212 may then receive the heated air (i.e., the thermal energy dissipated by the resistor system 710) via the one or more openings 761. As a result, the window section 212 may be warmed by the heated air (i.e., the thermal energy dissipated by the resistor system 710). In some implementations, the heated air transferred via the one or more openings 761 may be used to warm an interior surface and/or an exterior surface of one or more windows of the window section 212 for a de-icing operation.

Accordingly, in the window heating mode, the aircraft thermal management system 250 may help to warm the window section 212 by transferring thermal energy generated by the electric motors 241 (i.e., the thermal energy dissipated by the resistor system 710) to the window section 212. In such an implementation, the electric motors 241 may serve as a heat source for the window section 212.

In a further implementation, after a period of time from when the computing system 740 has enabled the window heating mode, the computing system 740 may receive one or more additional user inputs indicating that the window temperature of the window section 212 is to no longer be regulated. For example, the one or more additional user inputs may indicate that the window section is to no longer be warmed using the aircraft thermal management system 250. In such an implementation, the computing system 740 may disable the window heating mode for the aircraft thermal management system 250, such that the aircraft thermal management system 250 halts the transfer of thermal energy generated by the electric motors 241 (i.e., the thermal energy dissipated by the resistor system 710) to the window section 212. Instead, the computing system 740 may control the one or more actuators of the valve 750 so that the valve 750 may direct the flow of the heated air (i.e., the thermal energy dissipated by the resistor system 710) to the exterior of the helicopter 200.

As noted above, the aircraft thermal management system 250 may, along with the resistor system, include any components known to those skilled in the art that can be used to transfer thermal energy generated by the electric motors 241 to the window section 212. Accordingly, the components of the aircraft thermal management system 250 are not limited to the types and/or configurations described above.

Accordingly, in view of the implementations discussed above with respect to FIGS. 1-7, an aircraft thermal management system may use a resistor system to transfer thermal energy to one or more fuselage sections of an electric aircraft, where the thermal energy may have been generated by one or more electric motors in response to a deceleration of the aircraft. In some implementations, the aircraft thermal management system may be used to regulate one or more temperatures of the one or more fuselage sections. In one such implementation, the one or more electric motors of the electric aircraft may serve as a heat source for the one or more fuselage sections. In another implementation, the aircraft thermal management system may be used to transfer thermal energy to other fuselage sections not mentioned above and/or other areas of the electric aircraft.

In a further implementation, an aircraft thermal management system that uses a resistor system may incorporate more than one of the implementations described above with respect to FIGS. 1-7. For example, an aircraft thermal management system may use a resistor system to transfer thermal energy to both a cabin section and to a battery section of an electric aircraft. In some implementations, an aircraft thermal management system using a resistor system may include one or more components in configurations that are different from those described herein, including with a quantity of components and/or with types of components that are different from those mentioned above.

B. Fluid Heat Transfer System

As explained earlier, the electric motors 241 of FIG. 2 may generate thermal energy (i.e., heat) in response to an operation of the motors 241. In particular, while operating, one or more components of each electric motor 241 may generate thermal energy due to losses (e.g., resistive losses, magnetic losses, and/or the like). Though not shown in FIG. 2, such components may include one or more windings, one or more stator components (e.g., stator core, stator laminations, and/or the like), one or more rotor components (e.g., rotor core, rotor laminations, and/or the like), and/or any other components known to those skilled in the art. In one scenario, the thermal energy generated by these components may be transferred into a medium proximate to the electric motor (e.g., air surrounding the electric motors 241), such that the thermal energy may be dissipated away from the electric motors 241.

In another scenario, the thermal energy generated by the components of the electric motors 241 may be dissipated away from the motors 241 using a fluid heat transfer system. In such a scenario, the fluid heat transfer system may be configured to transfer the generated thermal energy away from the electric motors 241 using a fluid, one or more thermal channels, and/or the like. The fluid heat transfer system may also include any other components known to those skilled in the art, such as, but not limited to, one or more heat exchangers, one or more fans, one or more sensors, one or more pumps, one or more valves, and/or the like. The fluid heat transfer system is described in further detail below.

In view of the above, in one implementation, the aircraft thermal management system 250 may be configured to transfer the thermal energy generated by the electric motors 241 in response to an operation of the motors 241, such as during and/or after the operation of the motors 241. In one such implementation, the aircraft thermal management system 250 may use one or more components of a fluid heat transfer system described above. Using these components (e.g., one or more thermal channels, fluid, and/or the like), the aircraft thermal management system 250 may be configured to transfer the thermal energy generated by the electric motors 241 to one or more fuselage sections for various uses. In particular, by transferring the thermal energy to the fuselage sections, the aircraft thermal management system 250 can be used to regulate one or more temperatures of the fuselage sections. Various implementations of an aircraft thermal management system 250 that uses one or more components of a fluid heat transfer system are further described below.

1. Cabin Section

In one implementation, the aircraft thermal management system 250 of FIG. 2 may use a fluid heat transfer system (not shown) to transfer thermal energy to the cabin section 211, where the thermal energy may have been generated by the electric motors 241 in response to an operation of the motors 241, such as during and/or after the operation of the motors 241. As explained above, the cabin section 211 may include the area of the fuselage 210 in which the cabin is disposed. In some implementations, the aircraft thermal management system 250 may be used to regulate the cabin temperature of the cabin section 211, including the cabin.

Figure 8:
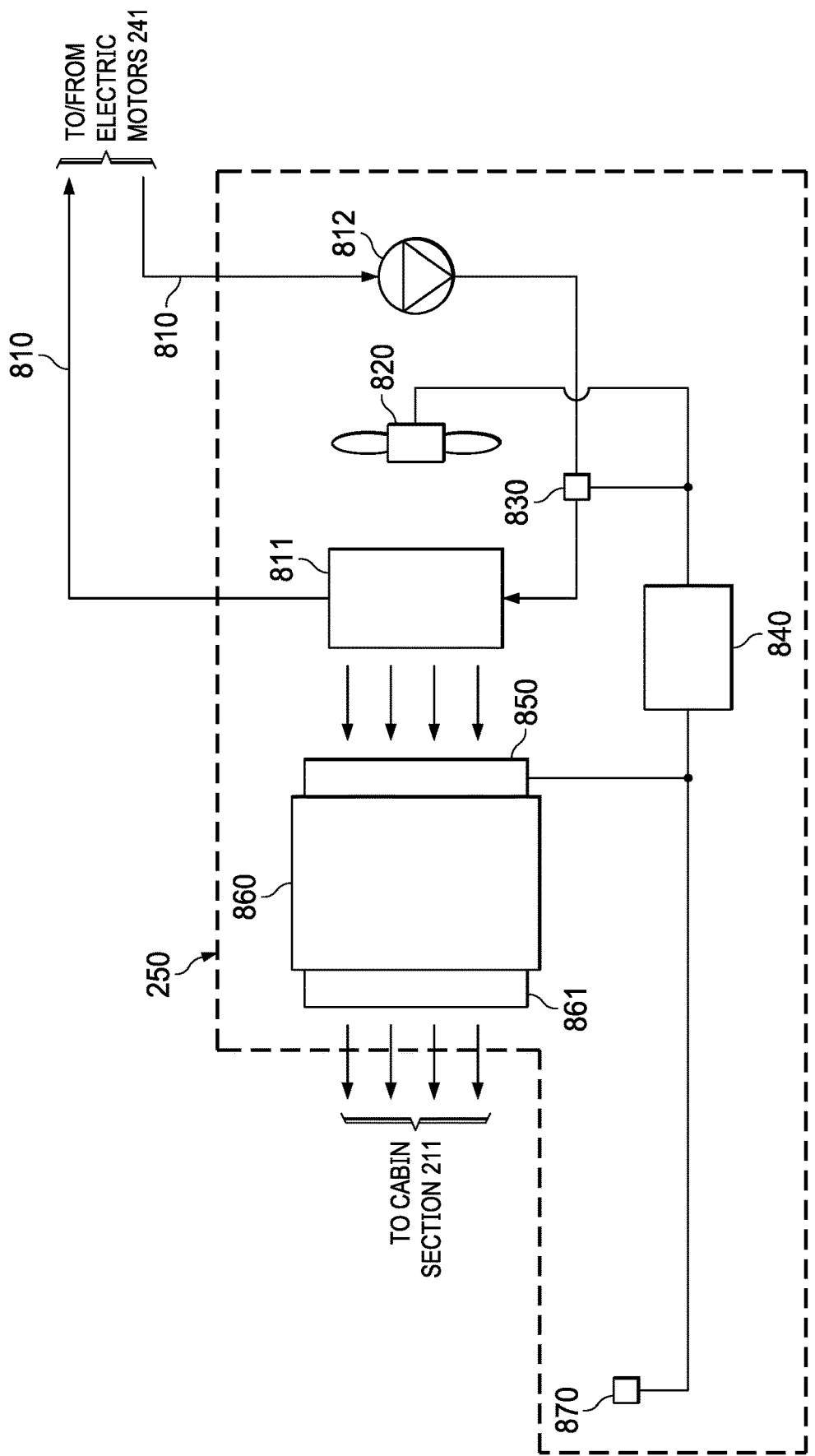

In one implementation, the aircraft thermal management system 250 may include one or more components of a fluid heat transfer system for use in transferring the thermal energy to the cabin section 211. As noted above, the components of a fluid heat transfer system may include at least a fluid, one or more thermal channels, and/or the like. The aircraft thermal management system 250 may also include any other components known to those skilled in the art that can be used to transfer the thermal energy to the cabin section 211. For example, FIG. 8 illustrates a schematic diagram of the aircraft thermal management system 250 in accordance with implementations of various techniques described herein, where the aircraft thermal management system 250 includes a thermal channel loop 810 and a fluid (not shown). The thermal channel loop 810 may correspond to the one or more connections 251 of FIG. 2. As shown in FIG. 8, the aircraft thermal management system 250 may also include a heat exchanger 811, a pump 812, a fan 820, a fluid temperature sensor 830, a computing system 840, a valve 850, an air outlet 860, and a cabin temperature sensor 870. As noted above, the aircraft thermal management system 250 may be disposed in the fuselage 210 (not shown). In a further implementation, one or more components of the aircraft thermal management system 250 may be disposed within and/or proximate to the cabin section 211 (not shown), where such components may include the cabin temperature sensor 870, at least a portion of the computing system 840, and/or the like.

In one implementation, the fluid may circulate within the thermal channel loop 810. In such an implementation, the fluid and the thermal channel loop 810 may be used to transfer the thermal energy (i.e., heat) generated by the electric motors 241 (not shown) to the cabin section 211 via the flow of the fluid through the thermal channel loop 810. The fluid may be any fluid used to regulate temperature that is known to those skilled in the art, where the fluid may be a liquid or a gas. For example, the fluid may include, but is not limited to, air, water, water-based coolants, glycol-based liquids, oil, and/or the like.

The thermal channel loop 810 may be composed of one or more thermal channels. The one or more thermal channels may include any tubing, piping, and/or the like and may be at least partially composed of thermally conductive material. In one implementation, the thermal channel loop 810 may be configured to allow for the transfer of thermal energy between the electric motors 241 and the fluid contained within the thermal channel loop 810. Further, the one or more thermal channels may be arranged in any configuration known to those skilled in the art, including in the form of the thermal channel loop 810 shown in FIG. 8. In addition, the pump 812 may be coupled to the thermal channel loop 810, such that the pump 812 may be used to circulate the fluid throughout the thermal channel loop 810. The pump 812 may be any pump known to those skilled in the art.

Figure 9:
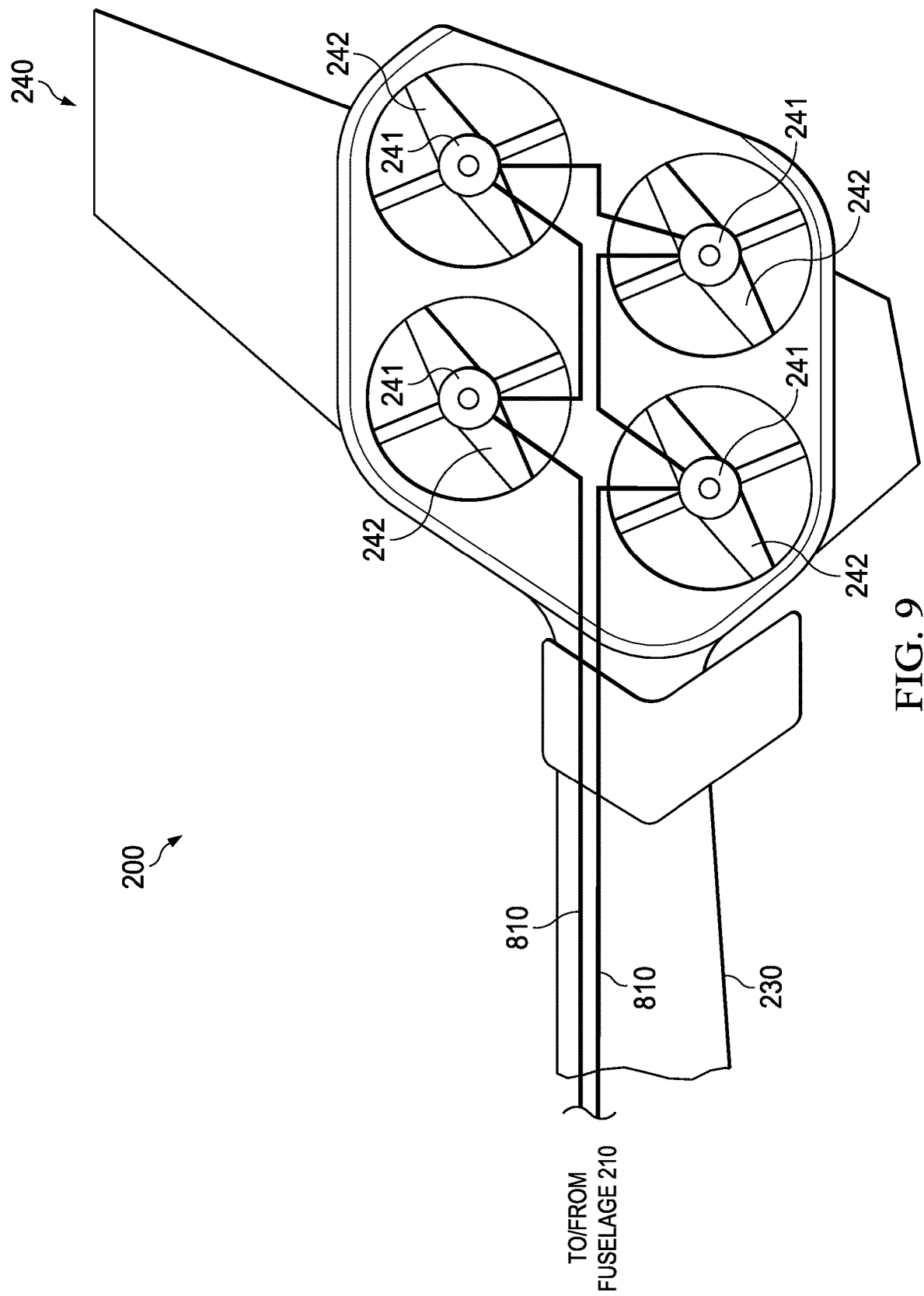
FIG. 9 illustrates a cross-sectional view of a portion of a helicopter in accordance with implementations of various techniques described herein.

As shown in FIG. 8, a portion of the thermal channel loop 810 may be disposed in the aircraft thermal management system 250 and, thus, may also be disposed in the fuselage 210 (not shown). In addition, other portions of the thermal channel loop 810 may be disposed in the tail member 230 (not shown) and the tail rotor system 240 (not shown). In particular, within the tail rotor system 240, a portion of the thermal channel loop 810 may be positioned on and/or proximate to the electric motors 241. For example, FIG. 9 illustrates a cross-sectional view of a portion of the helicopter 200 in accordance with implementations of various techniques described herein, where, as shown, the thermal channel loop 810 may be positioned on and/or adjacent to each of the electric motors 241. In one implementation, the thermal channel loop 810 may be integrated into a motor installation beam (not shown) for each electric motor 241 and may also be positioned away from each of the tail rotors 242.

As mentioned above, the fluid and the thermal channel loop 810 may be used to transfer the thermal energy (i.e., heat) generated by the electric motors 241 away from the motors 241, such as during and/or after an operation of the motors 241. In one implementation, during and/or after the operation of the electric motors 241, the fluid may flow past the electric motors 241 while circulating within the thermal channel loop 810. In such an implementation, during and/or after the operation of the electric motors 241, the thermal energy generated by the motors 241 may be transferred away from the motors 241 and into the fluid, which may facilitate a cooling of the motors 241 and may cause the fluid to be heated. The heated fluid may include the thermal energy generated by the electric motors 241.

The heated fluid (i.e., the thermal energy generated by the electric motors 241) may then circulate away from the electric motors 241 via the thermal channel loop 810. In particular, the heated fluid may circulate away from the electric motors 241 and toward the portion of the thermal channel loop 810 disposed in the aircraft thermal management system 250 and, thus, also disposed in the fuselage 210 (not shown). Accordingly, the thermal energy generated by the electric motors 241 during and/or after an operation of the motors 241 may be transferred, such as through convective heat transfer, to the aircraft thermal management system 250 (and thus the fuselage 210) via the fluid and the thermal channel loop 810.

Returning to FIG. 8, the heat exchanger 811 of the aircraft thermal management system 250 may be coupled to and/or may be part of the thermal channel loop 810, such that the fluid (e.g., the heated fluid) may flow through the heat exchanger 811 via the thermal channel loop 810 after circulating away from the electric motors 241. The heat exchanger 811 may be configured to transfer thermal energy between this fluid of the thermal channel loop 810 and a medium proximate to the heat exchanger 811 (e.g., air proximate to the heat exchanger 811). The heat exchanger 811 may be any heat exchanger known to those skilled in the art. In particular, the heat exchanger 811 can be of any shape (e.g., coiled) and may be composed of any material (e.g., copper, aluminum, brass, and/or the like) known to those skilled in the art. In some implementations, the heat exchanger 811 may include one or more fins.

In one implementation, the heated fluid (i.e., the thermal energy generated by the electric motors 241) may flow through the heat exchanger 811 via the thermal channel loop 810 after circulating away from the electric motors 241. The heat exchanger 811 may be configured to then transfer the thermal energy away from the heated fluid and into the air proximate to the heat exchanger 811, which may cause this air to be heated and may facilitate a cooling of the fluid. The heated air proximate to the heat exchanger 811 may include the thermal energy generated by the electric motors 241. The cooled fluid may circulate away from the heat exchanger 811 via the thermal channel loop 810 and may again flow towards the electric motors 241, such that, in the same manner as described above, additional thermal energy generated by the electric motors 241 may be transferred away from the motors 241 and into the fluid.

The fan 820 may be used to circulate air over and/or through the heat exchanger 811 to assist with the transfer of thermal energy between the between the fluid of the thermal channel loop 810 flowing through the heat exchanger 811 and a medium (e.g., air) proximate to the heat exchanger 811. In one implementation, the fan 820 may be used to circulate the heated air (i.e., the thermal energy generated by the electric motors 241) proximate to the heat exchanger 811 in a direction away from the heat exchanger 811. The fan 820 may be any fan known to those skilled in the art.

The valve 850 and the air outlet 860 may be used to transfer the thermal energy generated by the electric motors 241 to the cabin section 211. In particular, the fan 820 may be configured to circulate the heated air (i.e., the thermal energy generated by the electric motors 241) away from the heat exchanger 811 and toward the valve 850. Thus, the valve 850 may be configured to receive a flow of the heated air via the heat exchanger 811 and the fan 820. In some instances, the valve 850 may then be used to direct this flow of heated air to the air outlet 860. The valve 850 may be any valve known to those skilled in the art, including, but not limited to, a damper valve. In a further implementation, the valve 850 may be controlled using one or more actuators (not shown). The air outlet 860 may be configured to receive the flow of heated air via the valve 850, such that the heated air may pass through the air outlet 860 and to the cabin section 211 via one or more openings 861 of the air outlet 860. The air outlet 860 and its one or more openings 861 may be the same as the air outlet 360 and the one or more openings 361 described above with respect to FIG. 3.

Thus, the fan 820, the valve 850, and the air outlet 860 may be used together to direct the heated air (i.e., the thermal energy generated by the electric motors 241) to the cabin section 211 from the heat exchanger 811, thereby helping to transfer the thermal energy generated by the electric motors 241 to the cabin section 211 during and/or after the operation of the electric motors 241. As a result, an atmosphere of the cabin section 211 may be warmed by the heated air (i.e., the thermal energy generated by the electric motors 241). In a further implementation, the valve 850 may be adjusted so that it may instead direct the flow of heated air (i.e., the thermal energy generated by the electric motors 241) to an exterior of the helicopter 200 using a different air outlet (not shown), thereby helping to transfer the thermal energy generated by the electric motors 241 away from the cabin section 211 and to the outside of the helicopter 200. In such an implementation, the valve 850 may be adjusted by controlling one or more of its actuators.

The fluid temperature sensor 830 may be positioned on, in, or proximate to the thermal channel loop 810, such that the fluid temperature sensor 830 may be used to measure a temperature of the fluid circulating within the thermal channel loop 810. A temperature of the fluid may hereinafter be referred to as a fluid temperature. In some implementations, the fluid temperature sensor 830 may be positioned such that it is configured to measure the fluid temperature of the fluid flowing to the heat exchanger 811. The fluid temperature sensor 830 may be any sensor known to those skilled in the art. In addition, the cabin temperature sensor 870 may be the same as the cabin temperature sensor 370 described earlier with respect to FIG. 3.

The computing system 840 may be used to control the aircraft thermal management system 250, such as by communicating with one or more components of the aircraft thermal management system 250. In one implementation, the computing system 840 may be in communication with the fan 820, the valve 850, the fluid temperature sensor 830, and/or the cabin temperature sensor 870. In such an implementation, the computing system 840 may be used to control the operation of the fan 820, such as by controlling a fan speed and/or whether the fan 820 is operational. In another implementation, the computing system 840 may be used to control one or more actuators of the valve 850, such that the computing system 840 may control a direction of the flow of heated air received by the valve 850 (e.g., whether the heated air is directed to the air outlet 860 or to an exterior of the helicopter 200). In yet another implementation, the computing system 840 may be configured to receive one or more measurements from the fluid temperature sensor 830 and/or the cabin temperature sensor 870. The computing system 840 may also be in communication with and/or used to control other components of the helicopter 200, such as the main rotor system 220 (not shown), the tail rotor system 240 (not shown), one or more other onboard electric components, and/or one or more other onboard computing systems.

The computing system 840 may communicate with one or more components of the aircraft thermal management system 250 and/or with other components of the helicopter 200 using any type of communication (e.g., wired and/or wireless) known to those skilled in the art. As similarly explained above with respect to the computing system 340 of FIG. 3, at least a portion of the computing system 840 may be disposed within and/or proximate to the cabin section 211 (not shown), including, but not limited to, the one or more input devices and/or the one or more output devices described above. The computing system 840 is described in further detail in a later section.

In operation, the aircraft thermal management system 250 may use the above-described components to transfer thermal energy to the cabin section 211, where the thermal energy may have been generated by the electric motors 241 in response to an operation of the motors 241, such as during and/or after the operation of the motors 241. In particular, the aircraft thermal management system 250 may use the above-described components to regulate the cabin temperature of the cabin section 211.

Initially, such as after a takeoff of the helicopter 200, the aircraft thermal management system 250 may use the above-described components to facilitate a cooling of the electric motors 241 during and/or after an operation of the motors 241. As explained earlier, fluid may circulate within the thermal channel loop 810 due to, at least in part, the pump 812. In addition, during and/or after the operation of the electric motors 241, the thermal energy generated by the motors 241 may be transferred away from the motors 241 and into the fluid as it flows past the motors 241 in the thermal channel loop 810, which may facilitate a cooling of the motors 241 and may cause the fluid to be heated. The heated fluid (i.e., the thermal energy generated by the electric motors 241) may then circulate away from the electric motors 241 and toward the portion of the thermal channel loop 810 disposed in the aircraft thermal management system 250. In particular, the heated fluid (i.e., the thermal energy generated by the electric motors 241) may flow through the heat exchanger 811 via the thermal channel loop 810. The heat exchanger 811 may then transfer the thermal energy away from the heated fluid and into the air proximate to the heat exchanger 811, which may cause this air to be heated and may facilitate a cooling of the fluid. The cooled fluid may circulate away from the heat exchanger 811 via the thermal channel loop 810 and may again flow towards the electric motors 241, such that additional thermal energy generated by the electric motors 241 may be transferred away from the motors 241 and into the fluid.

The computing system 840 may control the fan 820 so that it may circulate the heated air (i.e., the thermal energy generated by the electric motors 241) away from the heat exchanger 811 and toward the valve 850. Thus, the valve 850 may receive a flow of the heated air via the heat exchanger 811 and the fan 820. The computing system 840 may control one or more actuators of the valve 850 so that the valve 850 may direct the flow of heated air to an exterior of the helicopter 200 using an air outlet (not shown), thereby helping to transfer the thermal energy generated by the electric motors 241 to the outside of the helicopter 200. Further, by transferring the thermal energy generated by the electric motors 241 away from the motors 241 in such a manner, the components of the aircraft thermal management system 250 may be used to facilitate a cooling of the electric motors 241.

In one implementation, the computing system 840 may receive one or more user inputs indicating that the cabin temperature of the cabin section 211 is to be regulated, where the one or more user inputs may be received during and/or after the operation of the electric motors 241. In particular, the one or more user inputs may indicate that an atmosphere of the cabin section 211 is to be warmed using the aircraft thermal management system 250. The one or more user inputs may be provided by one or more human pilots and/or one or more human passengers using one or more input devices of the computing system 840. The one or more user inputs may be any type of user input known to those skilled in the art, including, but not limited to, the activation of an electronic button, a contact input on a touch sensitive panel, and/or the like.

After receiving the one or more user inputs, the computing system 840 may receive and analyze measurements from the fluid temperature sensor 830 and the cabin temperature sensor 870. As noted above, the fluid temperature sensor 830 may be positioned such that it is configured to measure the fluid temperature of the fluid flowing to the heat exchanger 811. In one implementation, the computing system 840 may compare one or more measurements from the fluid temperature sensor 830 with one or more measurements from the cabin temperature sensor 870.

If the comparison indicates that the fluid temperature is greater than the cabin temperature, then the heated air (i.e., the thermal energy generated by the electric motors 241) may also have a temperature that is greater than the cabin temperature, as the heated air is generated by the heat exchanger 811 using the fluid flowing to the heat exchanger 811. Based on such a comparison, the computing system 840 may then enable a cabin heating mode for the aircraft thermal management system 250. In the cabin heating mode, the aircraft thermal management system 250 may be configured to help warm an atmosphere of the cabin section 211 (not shown), including the cabin. In particular, in the cabin heating mode, the computing system 840 may adjust the valve 850 so that, after receiving the flow of heated air (i.e., the thermal energy generated by the electric motors 241) via the heat exchanger 811 and the fan 820, the valve 850 may direct the flow of heated air to the air outlet 860. The computing system 840 may adjust the valve 850 by controlling the one or more actuators of the valve 850. In some implementations, the computing system 840 may increase the fan speed of the fan 820 so that the valve 850 receives an increased flow of the heated air. The air outlet 860 may receive the heated air via the valve 850, and the heated air may then pass through the air outlet 860 to one or more openings 861 of the air outlet 860. The cabin section 211 may then receive the heated air (i.e., the thermal energy generated by the electric motors 241) via the one or more openings 861.

Given that the measurements from the fluid temperature sensor 830 and the cabin temperature sensor 870 indicate that the fluid temperature (and, thus, the temperature of the heated air) is greater than the cabin temperature, the heated air (i.e., the thermal energy generated by the electric motors 241) may be warmer than the atmosphere of the cabin section 211. Thus, the heated air (i.e., the thermal energy generated by the electric motors 241) received from the air outlet 860 may help to warm the atmosphere of the cabin section 211 (including the cabin). Accordingly, in the cabin heating mode, the aircraft thermal management system 250 may help to warm the atmosphere of the cabin section 211 by transferring the thermal energy generated by the electric motors 241 to the cabin section 211 during and/or after an operation of the motors 241. In such an implementation, the electric motors 241 may serve as a heat source for the cabin section 211.

Conversely, if the comparison of measurements indicates that the fluid temperature (and, thus, the temperature of the heated air) is less than or equal to the cabin temperature, then the aircraft thermal management system 250 may be unable to warm the atmosphere of the cabin section 211 using the heated air (i.e., the thermal energy generated by the electric motors 241). Consequently, despite the one or more user inputs indicating that the atmosphere of the cabin section 211 is to be warmed, the computing system 840 may not enable the cabin heating mode for the aircraft thermal management system 250. In particular, the computing system 840 may not allow the aircraft thermal management system 250 to transfer the flow of heated air (i.e., the thermal energy generated by the electric motors 241) to the cabin section 211. Instead, the computing system 840 may control the one or more actuators of the valve 850 so that the valve 850 may continue to direct the flow of the heated air to the exterior of the helicopter 200. Accordingly, in such a scenario, the computing system 840 may not allow the aircraft thermal management system 250 to warm the atmosphere of the cabin section 211 via the transfer of thermal energy generated by the electric motors 241 to the cabin section 211.

Other implementations for the one or more user inputs mentioned above may also be used. In one such implementation, after a period of time from when the computing system 840 has enabled the cabin heating mode, the computing system 840 may receive one or more additional user inputs indicating that the cabin temperature of the cabin section 211 is to no longer be regulated. For example, the one or more additional user inputs may indicate that the atmosphere of the cabin section 211 is to no longer be warmed using the aircraft thermal management system 250. In such an implementation, the computing system 840 may disable the cabin heating mode for the aircraft thermal management system 250, such that the aircraft thermal management system 250 halts the transfer of thermal energy generated by the electric motors 241 to the cabin section 211. Instead, the computing system 840 may control the one or more actuators of the valve 850 so that the valve 850 may direct the flow of the heated air (i.e., the thermal energy generated by the electric motors 241) to the exterior of the helicopter 200.

In another such implementation, the one or more user inputs received by the computing system 840 may indicate the minimum cabin temperature level for the cabin temperature, where the aircraft thermal management system 250 is to warm an atmosphere of the cabin section 211 if a measurement from the cabin temperature sensor 870 indicates that the cabin temperature is less than the minimum cabin temperature level. For example, a human pilot may provide contact inputs on a touch sensitive panel that indicate that the minimum cabin temperature level is 20 degrees Celsius. If the computing system 840 receives a measurement from the cabin temperature sensor 870 indicating that the cabin temperature is less than 20 degrees Celsius, then the computing system 840 may proceed with comparing measurements from the fluid temperature sensor 830 and the cabin temperature sensor 870. The computing system 840 may then enable or not enable the cabin heating mode for the aircraft thermal management system 250 based on the comparison, as described above.

Conversely, if the computing system 840 receives a measurement from the cabin temperature sensor 870 indicating that the cabin temperature is greater than or equal to the minimum cabin temperature level, then the computing system 840 may not enable the cabin heating mode for the aircraft thermal management system 250, as described above. Instead, the computing system 840 may control the one or more actuators of the valve 850 so that the valve 850 may direct the flow of the heated air (i.e., the thermal energy generated by the electric motors 241) to the exterior of the helicopter 200.

In another implementation, the computing system 840 may continuously monitor measurements from the cabin temperature sensor 870. For example, as described above, the computing system 840 may continuously monitor measurements from the cabin temperature sensor 870 after enabling the cabin heating mode based on the comparison of the cabin temperature with the minimum cabin temperature level. If the cabin temperature changes over time such that the cabin temperature becomes greater than or equal to the minimum cabin temperature level, then the computing system 840 may disable the cabin heating mode for the aircraft thermal management system 250, as described above. In particular, the computing system 840 may control the one or more actuators of the valve 850 so that the valve 850 may direct the flow of the heated air (i.e., the thermal energy generated by the electric motors 241) to the exterior of the helicopter 200. In another example, after not enabling the cabin heating mode based on a comparison of the cabin temperature with the fluid temperature, as described above, the computing system 840 may continuously monitor measurements from the cabin temperature sensor 870 and the fluid temperature sensor 830. If the fluid temperature and/or the cabin temperature change over time such that the fluid temperature becomes greater than the cabin temperature, then the computing system 840 may proceed to enable the cabin heating mode for the aircraft thermal management system 250, as described above.

As noted above, the aircraft thermal management system 250 may, along with one or more components of a fluid heat transfer system, include any components known to those skilled in the art that can be used to transfer thermal energy generated by the electric motors 241 to the cabin section 211. Accordingly, the components of the aircraft thermal management system 250 are not limited to the types and/or configurations described above.

2. Battery Section

As explained above with respect to FIG. 2, the fuselage 210 of the helicopter 200 may include a battery section (not shown). In particular, the battery section may include an area of the fuselage 210 in which the battery pack is disposed. As also explained above, an operating temperature of the battery pack of the helicopter 200 may be referred to as a battery temperature, and the battery pack may have a minimum battery temperature level. The battery section and the battery pack referenced below may be the same as the battery section and the battery pack described earlier.

In one implementation, the aircraft thermal management system 250 may be used to regulate the battery temperature of the battery pack. In such an implementation, the aircraft thermal management system 250 of FIG. 2 may use a fluid heat transfer system (not shown) to transfer thermal energy to the battery section, where the thermal energy may have been generated by the electric motors 241 in response to an operation of the motors 241, such as during and/or after the operation of the motors 241. In particular, the aircraft thermal management system 250 may transfer the thermal energy to the battery section in order to maintain the battery temperature of the battery pack to a level that is greater than or equal to its minimum battery temperature level.

Figure 10:
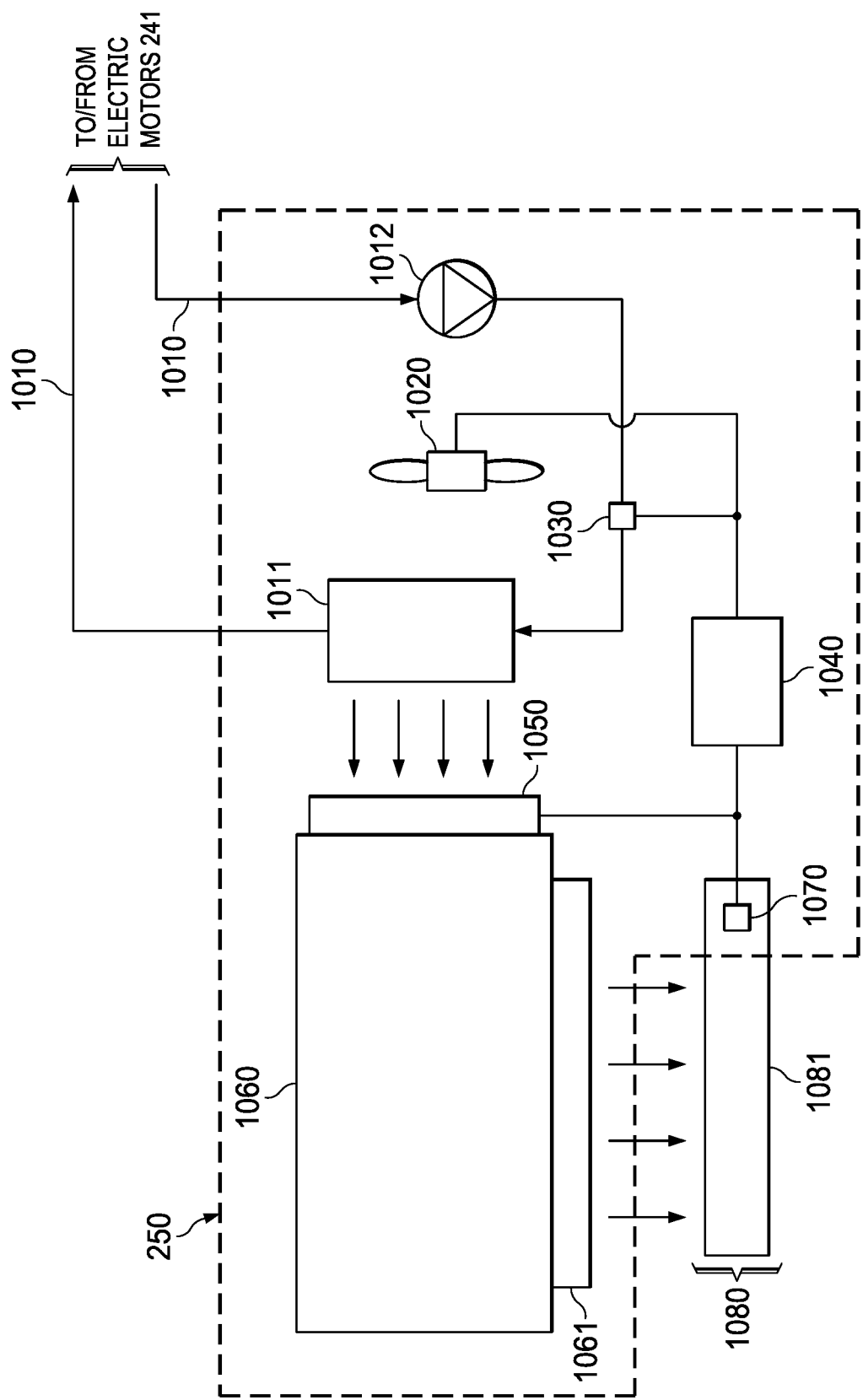
FIGS. 10-12 illustrate a schematic diagram of an aircraft thermal management system in accordance with implementations of various techniques described herein.

The aircraft thermal management system 250 may include one or more components of a fluid heat transfer system for use in transferring the thermal energy to the battery section. As noted above, the components of a fluid heat transfer system may include at least a fluid, one or more thermal channels, and/or the like. The aircraft thermal management system 250 may also include any other components known to those skilled in the art that can be used to transfer the thermal energy to the battery section. For example, FIG. 10 illustrates a schematic diagram of the aircraft thermal management system 250 in accordance with implementations of various techniques described herein, where the aircraft thermal management system 250 includes a thermal channel loop 1010 and a fluid (not shown). The thermal channel loop 1010 may correspond to the one or more connections 251 of FIG. 2. As shown in FIG. 10, the aircraft thermal management system 250 may also include a heat exchanger 1011, a pump 1012, a fan 1020, a fluid temperature sensor 1030, a computing system 1040, a valve 1050, an air outlet 1060, and a battery temperature sensor 1070. As noted above, the aircraft thermal management system 250 may be disposed in the fuselage 210 (not shown).

As mentioned above, the fluid and the thermal channel loop 1010 may be used to transfer the thermal energy (i.e., heat) generated by the electric motors 241 away from the motors 241, such as during and/or after an operation of the motors 241. In particular, the fluid and the thermal channel loop 1010 may be used to transfer the thermal energy generated by the electric motors 241 (not shown) to a battery section 1080 of the helicopter 200 via the flow of the fluid through the thermal channel loop 1010. The battery section 1080 may contain a battery pack 1081, where the battery section 1080 and the battery pack 1081 may be the same as the battery section 580 and the battery pack 581 of FIG. 5. In a further implementation, one or more components of the aircraft thermal management system 250 may be disposed within and/or proximate to the battery section 1080, where such components may include the battery temperature sensor 1070.

The fluid, the thermal channel loop 1010, the heat exchanger 1011, the pump 1012, and the fan 1020, respectively, may be the same as the fluid, the thermal channel loop 810, the heat exchanger 811, the pump 812, and the fan 820, respectively, discussed above with respect to FIGS. 8-9. In one implementation, the fluid may circulate within the thermal channel loop 1010, such as through, at least in part, the use of the pump 1012. In such an implementation, during and/or after an operation of the electric motors 241, the thermal energy (i.e., heat) generated by the motors 241 may be transferred away from the motors 241 and into the fluid of the thermal channel loop 1010, which may facilitate a cooling of the motors 241 and may cause the fluid to be heated. Using the thermal channel loop 1010, the heated fluid (i.e., the thermal energy generated by the electric motors 241) may then circulate away from the electric motors 241 and to the aircraft thermal management system 250 (and thus the fuselage 210). The heated fluid (i.e., the thermal energy generated by the electric motors 241) may flow through the heat exchanger 1011, such that the heat exchanger 1011 may be configured to transfer the thermal energy away from the heated fluid and into the air proximate to the heat exchanger 1011, thereby causing this air to be heated and facilitating a cooling of the fluid. As explained above with respect to FIG. 8-9, the cooled fluid may circulate away from the heat exchanger 1011 via the thermal channel loop 1010 and may again flow towards the electric motors 241, such that additional thermal energy generated by the electric motors 241 may be transferred away from the motors 241 and into the fluid. The fan 1020 may be used to circulate the heated air (i.e., the thermal energy generated by the electric motors 241) proximate to the heat exchanger 1011 in a direction away from the heat exchanger 1011.

The valve 1050 and the air outlet 1060 may be used to transfer the thermal energy generated by the electric motors 241 to the battery section 1080 and, thus, the battery pack 1081. In particular, the fan 1020 may be configured to circulate the heated air (i.e., the thermal energy generated by the electric motors 241) away from the heat exchanger 1011 and toward the valve 1050. Thus, the valve 1050 may be configured to receive a flow of the heated air via the heat exchanger 1011 and the fan 1020. In some instances, the valve 1050 may then be used to direct this flow of heated air to the air outlet 1060. The valve 1050 may be any valve known to those skilled in the art, including, but not limited to, a damper valve. In a further implementation, the valve 1050 may be controlled using one or more actuators (not shown). The air outlet 1060 may be configured to receive the flow of heated air via the valve 1050, such that the heated air may pass through the air outlet 1060 and to the battery section 1080 (and, thus, the battery pack 1081) via one or more openings 1061 of the air outlet 1060. The air outlet 1060 and its one or more openings 1061 may be the same as the air outlet 560 and its one or more openings 561 described above with respect to FIG. 5.

Thus, the fan 1020, the valve 1050, and the air outlet 1060 may be used together to direct the heated air (i.e., the thermal energy generated by the electric motors 241) to the battery section 1080, thereby helping to transfer the thermal energy generated by the electric motors 241 to the battery section 1080. As a result, the battery section 1080 and its battery pack 1081 may be warmed by the heated air (i.e., the thermal energy generated by the electric motors 241). In a further implementation, the valve 1050 may be adjusted so that it may instead direct the flow of heated air (i.e., the thermal energy generated by the electric motors 241) to an exterior of the helicopter 200 using a different air outlet (not shown), thereby helping to transfer the thermal energy generated by the electric motors 241 away from the battery section 1080 and to the outside of the helicopter 200. In such an implementation, the valve 1050 may be adjusted by controlling one or more of its actuators.

The fluid temperature sensor 1030 may be the same as the fluid temperature sensor 830 described earlier with respect to FIGS. 8-9. The battery temperature sensor 1070 may be the same as the battery temperature sensor 570 described earlier with respect to FIG. 5. The computing system 1040 may be used to control the aircraft thermal management system 250, such as by communicating with one or more components of the aircraft thermal management system 250. In one implementation, the computing system 1040 may be in communication with the fan 1020, the valve 1050, the fluid temperature sensor 1030, and/or the battery temperature sensor 1070. In such an implementation, the computing system 1040 may be used to control the operation of the fan 1020, such as by controlling a fan speed and/or whether the fan 1020 is operational. In another implementation, the computing system 1040 may be used to control one or more actuators of the valve 1050, such that the computing system 1040 may control a direction of the flow of heated air received by the valve 1050 (e.g., whether the heated air is directed to the air outlet 1060 or to an exterior of the helicopter 200). In yet another implementation, the computing system 1040 may be configured to receive one or more measurements from the fluid temperature sensor 1030 and/or the battery temperature sensor 1070. The computing system 1040 may also be in communication with and/or used to control other components of the helicopter 200, such as the main rotor system 220 (not shown), the tail rotor system 240 (not shown), one or more other onboard electric components, and/or one or more other onboard computing systems.

The computing system 1040 may communicate with one or more components of the aircraft thermal management system 250 and/or with other components of the helicopter 200 using any type of communication (e.g., wired and/or wireless) known to those skilled in the art. As similarly explained above with respect to the computing system 340 of FIG. 3, at least a portion of the computing system 1040 may be disposed within and/or proximate to the cabin section 211 (not shown), including, but not limited to, the one or more input devices and/or the one or more output devices described above. The computing system 1040 is described in further detail in a later section.

In operation, the aircraft thermal management system 250 may use the above-described components to transfer thermal energy to the battery section 1080, where the thermal energy may have been generated by the electric motors 241 in response to an operation of the motors 241, such as during and/or after the operation of the motors 241. In doing so, the aircraft thermal management system 250 may use the above-described components to regulate the battery temperature of the battery pack 1081. In one implementation, the aircraft thermal management system 250 may use the above-described components to maintain the battery temperature of the battery pack 1081 to a level that is greater than or equal to its minimum battery temperature level.

Initially, the computing system 1040 may receive one or more user inputs indicating the minimum battery temperature level for the battery pack 1081. In some implementations, the computing system 1040 may receive these one or more user inputs prior to takeoff of the helicopter 200. The one or more user inputs may be provided by one or more human pilots and/or one or more human passengers using one or more input devices of the computing system 1040. The one or more user inputs may be any type of user input known to those skilled in the art, including, but not limited to, input provided via keyboard, a contact input on a touch sensitive panel, and/or the like.

The aircraft thermal management system 250 may then use the above-described components to facilitate a cooling of the electric motors 241 during and/or after an operation of the motors 241, such as after a takeoff of the helicopter 200. As explained earlier, fluid may circulate within the thermal channel loop 1010 due to, at least in part, the pump 1012. In addition, during and/or after the operation of the electric motors 241, the thermal energy generated by the motors 241 may be transferred away from the motors 241 and into the fluid as it flows past the motors 241 in the thermal channel loop 1010, which may facilitate a cooling of the motors 241 and may cause the fluid to be heated. The heated fluid (i.e., the thermal energy generated by the electric motors 241) may then circulate away from the electric motors 241 and toward the portion of the thermal channel loop 1010 disposed in the aircraft thermal management system 250. In particular, the heated fluid (i.e., the thermal energy generated by the electric motors 241) may flow through the heat exchanger 1011 via the thermal channel loop 1010. The heat exchanger 1011 may then transfer the thermal energy away from the heated fluid and into the air proximate to the heat exchanger 1011, which may cause this air to be heated and may facilitate a cooling of the fluid. The cooled fluid may circulate away from the heat exchanger 1011 via the thermal channel loop 1010 and may again flow towards the electric motors 241, such that additional thermal energy generated by the electric motors 241 may be transferred away from the motors 241 and into the fluid.

The computing system 1040 may control the fan 1020 so that it may circulate the heated air (i.e., the thermal energy generated by the electric motors 241) away from the heat exchanger 1011 and toward the valve 1050. Thus, the valve 1050 may receive a flow of the heated air via the heat exchanger 1011 and the fan 1020. The computing system 1040 may control one or more actuators of the valve 1050 so that the valve 1050 may direct the flow of heated air to an exterior of the helicopter 200 using an air outlet (not shown), thereby helping to transfer the thermal energy generated by the electric motors 241 to the outside of the helicopter 200. Further, by transferring the thermal energy generated by the electric motors 241 away from the motors 241 in such a manner, the components of the aircraft thermal management system 250 may be used to facilitate a cooling of the electric motors 241.

In one implementation, while the helicopter 200 is in operation, the computing system 1040 may monitor the battery temperature of the battery pack 1081. In particular, the computing system 1040 may receive and analyze measurements from the battery temperature sensor 1070. In such an implementation, the computing system 1040 may compare one or more measurements from the battery temperature sensor 1070 with the minimum battery temperature level received earlier.

In one such implementation, if the computing system 100 receives a measurement from the battery temperature sensor 1070 indicating that the battery temperature is less than the minimum battery temperature level, then the computing system 1040 may receive and analyze measurements from the fluid temperature sensor 1030 and the battery temperature sensor 1070 to determine if the computing system 1040 can enable a battery heating mode for the aircraft thermal management system 250. As noted above, the fluid temperature sensor 1030 may be positioned such that it is configured to measure the fluid temperature of the fluid flowing to the heat exchanger 1011. In particular, the computing system 1040 may compare one or more measurements from the fluid temperature sensor 1030 with one or more measurements from the battery temperature sensor 1070.

If the comparison indicates that the fluid temperature is greater than the battery temperature, then the computing system 1040 may enable the battery heating mode for the aircraft thermal management system 250. In the battery heating mode, the aircraft thermal management system 250 may be configured to help warm an atmosphere of the battery section 1080 and, in turn, the battery pack 1081. In particular, in the battery heating mode, the computing system 1040 may adjust the valve 1050 so that, after receiving the flow of heated air (i.e., the thermal energy generated by the electric motors 241), the valve 1050 may direct the flow of heated air to the air outlet 1060. The computing system 1040 may adjust the valve 1050 by controlling the one or more actuators of the valve 1050. In some implementations, the computing system 1040 may increase the fan speed of the fan 1020 so that the valve 1050 receives an increased flow of heated air. The air outlet 1060 may receive the heated air via the valve 1050, and the heated air may then pass through the air outlet 1060 to one or more openings 1061 of the air outlet 1060. The battery section 1080 may then receive the heated air (i.e., the thermal energy generated by the electric motors 241) via the one or more openings 1061.

Given that the measurements from the fluid temperature sensor 1030 and the battery temperature sensor 1070 indicate that the fluid temperature (and, thus, the temperature of the heated air) is greater than the battery temperature, the heated air (i.e., the thermal energy generated by the electric motors 241) may be warmer than the atmosphere of the battery section 1080. Thus, the heated air (i.e., the thermal energy generated by the electric motors 241) received from the air outlet 1060 may help to warm the atmosphere of the battery section 1080 and, in turn, the battery pack 1081. Accordingly, in the battery heating mode, the aircraft thermal management system 250 may help to warm the battery pack 1081 by transferring thermal energy generated by the electric motors 241 to the battery section 1080 during and/or after an operation of the motors 241. In such an implementation, the electric motors 241 may serve as a heat source for the battery section 1080 and, in turn, the battery pack 1081.

Conversely, if the comparison of measurements indicates that the fluid temperature (and, thus, the temperature of the heated air) is less than or equal to the battery temperature, then the aircraft thermal management system 250 may be unable to warm the atmosphere of the battery section 1080 (along with the battery pack 1081) using the heated air (i.e., the thermal energy generated by the electric motors 241). Consequently, the computing system 1040 may not enable the battery heating mode for the aircraft thermal management system 250. In particular, the computing system 1040 may not allow the aircraft thermal management system 250 to transfer the flow of heated air (i.e., the thermal energy generated by the electric motors 241) to the battery section 1080. Instead, the computing system 1040 may control the one or more actuators of the valve 1050 so that the valve 1050 may continue to direct the flow of the heated air to the exterior of the helicopter 200. Accordingly, in such a scenario, the computing system 1040 may not allow the aircraft thermal management system 250 to warm the atmosphere of the battery section 1080 (along with the battery pack 1081) via the transfer of thermal energy generated by the electric motors 241 to the battery section 1080.

In another implementation, if the computing system 1040 receives a measurement from the battery temperature sensor 1070 indicating that the battery temperature is greater than or equal to the minimum battery temperature level, then the computing system 1040 may not enable the battery heating mode for the aircraft thermal management system 250, as described above. Instead, the computing system 1040 may control the one or more actuators of the valve 1050 so that the valve 1050 may continue to direct the flow of the heated air (i.e., the thermal energy generated by the electric motors 241) to the exterior of the helicopter 200.

In yet another implementation, the computing system 1040 may continuously monitor measurements from the battery temperature sensor 1070. For example, as described above, the computing system 1040 may continuously monitor measurements from the battery temperature sensor 1070 after enabling the battery heating mode based on the comparison of the battery temperature with the minimum battery temperature level. If the battery temperature changes over time such that the battery temperature becomes greater than or equal to the minimum battery temperature level, then the computing system 1040 may disable the battery heating mode for the aircraft thermal management system 250, such that the aircraft thermal management system 250 halts the transfer of thermal energy generated by the electric motors 241 to the battery section 1080. Instead, the computing system 1040 may control the one or more actuators of the valve 1050 so that the valve 1050 may direct the flow of the heated air (i.e., the thermal energy generated by the electric motors 241) to the exterior of the helicopter 200. In another example, after not enabling the battery heating mode based on a comparison of the battery temperature with the fluid temperature, as described above, the computing system 1040 may continuously monitor measurements from the fluid temperature sensor 1030 and the battery temperature sensor 1070. If the fluid temperature and/or the battery temperature change over time such that the fluid temperature becomes greater than the battery temperature, then the computing system 1040 may proceed to enable the battery heating mode for the aircraft thermal management system 250, as described above.

As noted above, the aircraft thermal management system 250 may, along with one or more components of a fluid heat transfer system, include any components known to those skilled in the art that can be used to transfer thermal energy generated by the electric motors 241 to the battery section 1080. Accordingly, the components of the aircraft thermal management system 250 are not limited to the types and/or configurations described above. For example, in one implementation, the thermal channel loop 810 may be thermally coupled to the battery pack 1081, such that the thermal channel loop 810 may also be disposed on and/or proximate to one or more cells of the battery pack 1081. In such an implementation, during and/or after an operation of the electric motors 241, the thermal energy generated by the motors 241 may be transferred away from the fluid of the thermal channel loop 1010 and to the cells of the battery pack 1081, thereby warming the cells of the battery pack 1081. In a further implementation, heated air (i.e., the thermal energy generated by the electric motors 241) received from the air outlet 1060, as described above, may also be used to warm the battery pack 1081.

3. Airframe Section

In one implementation, the aircraft thermal management system 250 of FIG. 2 may use a fluid heat transfer system (not shown) to transfer thermal energy to an airframe section (not shown), where the thermal energy may have been generated by the electric motors 241 in response to an operation of the motors 241, such as during and/or after the operation of the motors 241. The airframe section referred to below may be the same as the airframe section described above with respect to FIG. 6.

In some implementations, the aircraft thermal management system 250 may be used to regulate the airframe temperature of the airframe section of the fuselage 210, such as to perform a de-icing operation on the fuselage 210, as explained above. While various implementations for the aircraft thermal management system 250 are described herein with respect to regulating the airframe temperature of the fuselage 210, those skilled in the art will understand that the aircraft thermal management systems disclosed herein can be implemented to regulate one or more temperatures of one or more other components of an electric aircraft (e.g., a tail member), such as for one or more de-icing operations.

Figure 11:
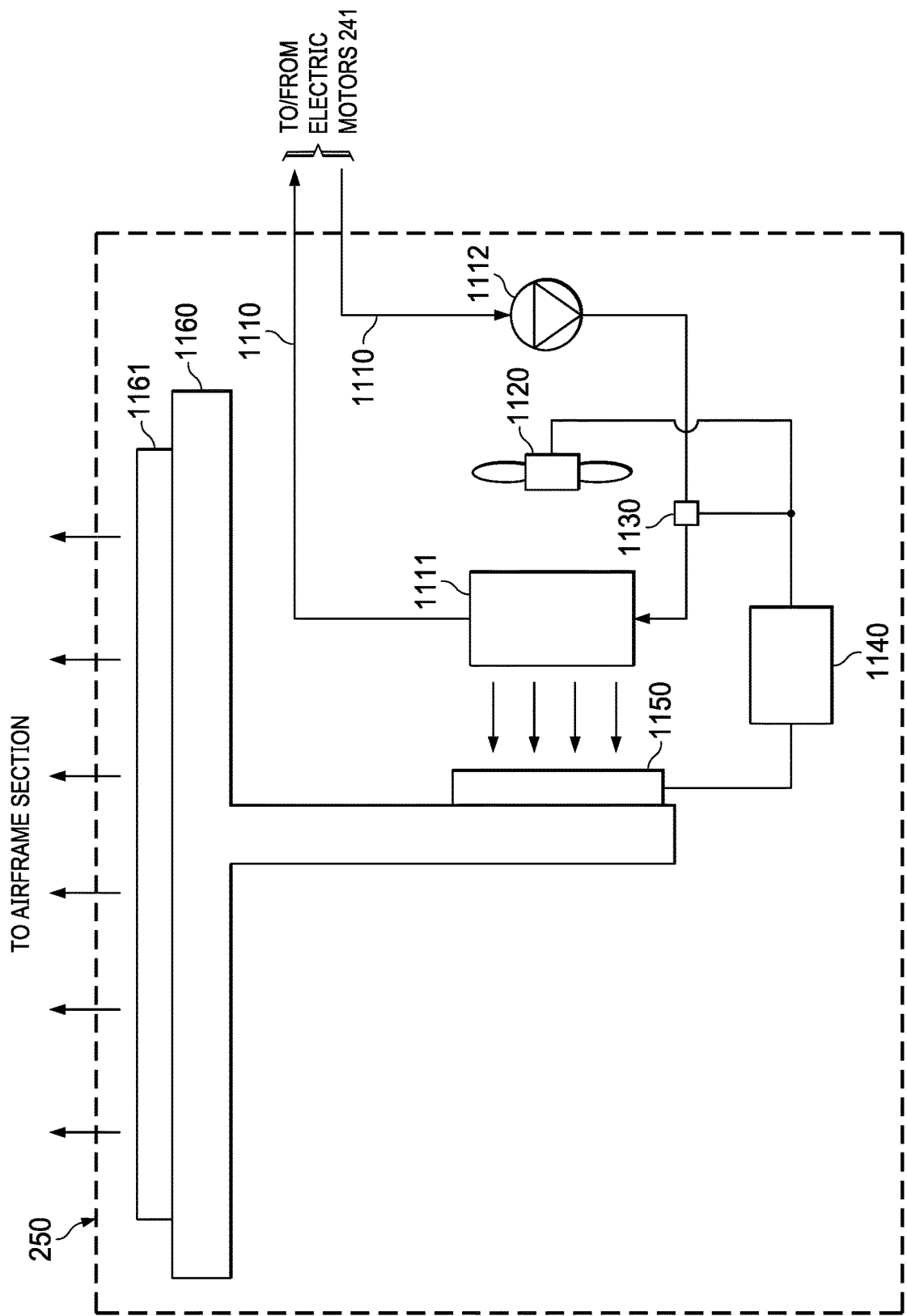

The aircraft thermal management system 250 may include one or more components of a fluid heat transfer system for use in transferring the thermal energy to the airframe section. As noted above, the components of a fluid heat transfer system may include at least a fluid, one or more thermal channels, and/or the like. The aircraft thermal management system 250 may also include any other components known to those skilled in the art that can be used to transfer the thermal energy to the airframe section. For example, FIG. 11 illustrates a schematic diagram of the aircraft thermal management system 250 in accordance with implementations of various techniques described herein, where the aircraft thermal management system 250 includes a thermal channel loop 1110 and a fluid (not shown). The thermal channel loop 1110 may correspond to the one or more connections 251 of FIG. 2. As shown in FIG. 11, the aircraft thermal management system 250 may also include a heat exchanger 1111, a pump 1112, a fan 1120, a fluid temperature sensor 1130, a computing system 1140, a valve 1150, and an air outlet 1160. As noted above, the aircraft thermal management system 250 may be disposed in the fuselage 210 (not shown).

As mentioned above, the fluid and the thermal channel loop 1110 may be used to transfer the thermal energy (i.e., heat) generated by the electric motors 241 away from the motors 241, such as during and/or after an operation of the motors 241. In particular, the fluid and the thermal channel loop 1110 may be used to transfer the thermal energy generated by the electric motors 241 (not shown) to the airframe section of the helicopter 200 via the flow of the fluid through the thermal channel loop 1110.

The fluid, the thermal channel loop 1110, the heat exchanger 1111, the pump 1112, and the fan 1120, respectively, may be the same as the fluid, the thermal channel loop 810, the heat exchanger 811, the pump 812, and the fan 820, respectively, discussed above with respect to FIGS. 8-9. In one implementation, the fluid may circulate within the thermal channel loop 1110, such as through, at least in part, the use of the pump 1112. In such an implementation, during and/or after an operation of the electric motors 241, the thermal energy (i.e., heat) generated by the motors 241 may be transferred away from the motors 241 and into the fluid of the thermal channel loop 1110, which may facilitate a cooling of the motors 241 and may cause the fluid to be heated. Using the thermal channel loop 1110, the heated fluid (i.e., the thermal energy generated by the electric motors 241) may then circulate away from the electric motors 241 and to the aircraft thermal management system 250 (and thus the fuselage 210). The heated fluid (i.e., the thermal energy generated by the electric motors 241) may flow through the heat exchanger 1111, such that the heat exchanger 1111 may be configured to transfer the thermal energy away from the heated fluid and into the air proximate to the heat exchanger 1111, thereby causing this air to be heated and facilitating a cooling of the fluid. As explained above with respect to FIG. 8-9, the cooled fluid may circulate away from the heat exchanger 1111 via the thermal channel loop 1110 and may again flow towards the electric motors 241, such that additional thermal energy generated by the electric motors 241 may be transferred away from the motors 241 and into the fluid. The fan 1120 may be used to circulate the heated air (i.e., the thermal energy generated by the electric motors 241) proximate to the heat exchanger 1111 in a direction away from the heat exchanger 1111.

The valve 1150 and the air outlet 1160 may be used to transfer the thermal energy generated by the electric motors 241 to the airframe section. In particular, the fan 1120 may be configured to circulate the heated air (i.e., the thermal energy generated by the electric motors 241) away from the heat exchanger 1111 and toward the valve 1150. Thus, the valve 1150 may be configured to receive a flow of the heated air via the heat exchanger 1111 and the fan 1120. In some instances, the valve 1150 may then be used to direct this flow of heated air to the air outlet 1160. The valve 1150 may be any valve known to those skilled in the art, including, but not limited to, a damper valve. In a further implementation, the valve 1150 may be controlled using one or more actuators (not shown).

The air outlet 1160 may be configured to receive the flow of heated air via the valve 1150, such that the heated air may pass through the air outlet 1160 and to the airframe section via one or more openings 1161 of the air outlet 1160. The air outlet 1160 and its one or more openings 1161 may be the same as the air outlet 660 and its one or more openings 661 described above with respect to FIG. 6. Those skilled in the art will understand that a configuration of the aircraft thermal management system 250, including the air outlet 1160 and its one or more openings 1161, is not limited to the configuration shown in FIG. 11.

Thus, the fan 1120, the valve 1150, and the air outlet 1160 may be used together to direct the heated air (i.e., the thermal energy generated by the electric motors 241) to the airframe section, thereby helping to transfer the thermal energy generated by the electric motors 241 to the airframe section. As a result, the airframe section may be warmed by the heated air (i.e., the thermal energy generated by the electric motors 241). In some implementations, the heated air may be used to warm the interior surface and/or the exterior surface of the fuselage 210 for a de-icing operation. In a further implementation, the valve 1150 may be adjusted so that it may instead direct the flow of heated air (i.e., the thermal energy generated by the electric motors 241) to an exterior of the helicopter 200 using a different air outlet (not shown), thereby helping to transfer the thermal energy generated by the electric motors 241 away from the airframe section and to the outside of the helicopter 200. In such an implementation, the valve 1150 may be adjusted by controlling one or more of its actuators.

The fluid temperature sensor 1130 may be the same as the fluid temperature sensor 830 described earlier with respect to FIGS. 8-9. The computing system 1140 may be used to control the aircraft thermal management system 250, such as by communicating with one or more components of the aircraft thermal management system 250. In one implementation, the computing system 1140 may be in communication with the fan 1120, the valve 1150, and/or the fluid temperature sensor 1130. In such an implementation, the computing system 1140 may be used to control the operation of the fan 1120, such as by controlling a fan speed and/or whether the fan 1120 is operational. In another implementation, the computing system 1140 may be used to control one or more actuators of the valve 1150, such that the computing system 1140 may control a direction of the flow of heated air received by the valve 1150 (e.g., whether the heated air is directed to the air outlet 1160 or to an exterior of the helicopter 200). In yet another implementation, the computing system 1140 may be configured to receive one or more measurements from the fluid temperature sensor 1130. The computing system 1140 may also be in communication with and/or used to control other components of the helicopter 200, such as the main rotor system 220 (not shown), the tail rotor system 240 (not shown), one or more other onboard electric components, and/or one or more other onboard computing systems.

The computing system 1140 may communicate with one or more components of the aircraft thermal management system 250 and/or with other components of the helicopter 200 using any type of communication (e.g., wired and/or wireless) known to those skilled in the art. As similarly explained above with respect to the computing system 340 of FIG. 3, at least a portion of the computing system 1140 may be disposed within and/or proximate to the cabin section 211 (not shown), including, but not limited to, the one or more input devices and/or the one or more output devices described above. The computing system 1140 is described in further detail in a later section.

In operation, the aircraft thermal management system 250 may use the above-described components to transfer thermal energy to the airframe section, where the thermal energy may have been generated by the electric motors 241 in response to an operation of the motors 241, such as during and/or after the operation of the motors 241. In particular, the aircraft thermal management system 250 may use the above-described components to regulate the airframe temperature of the airframe section. In one implementation, the aircraft thermal management system 250 may regulate the airframe temperature in order to perform a de-icing operation on the fuselage 210.

Initially, such as after a takeoff of the helicopter 200, the aircraft thermal management system 250 may use the above-described components to facilitate a cooling of the electric motors 241 during and/or after an operation of the motors 241. As explained earlier, fluid may circulate within the thermal channel loop 1110 due to, at least in part, the pump 1112. In addition, during and/or after the operation of the electric motors 241, the thermal energy generated by the motors 241 may be transferred away from the motors 241 and into the fluid as it flows past the motors 241 in the thermal channel loop 1110, which may facilitate a cooling of the motors 241 and may cause the fluid to be heated. The heated fluid (i.e., the thermal energy generated by the electric motors 241) may then circulate away from the electric motors 241 and toward the portion of the thermal channel loop 1110 disposed in the aircraft thermal management system 250. In particular, the heated fluid (i.e., the thermal energy generated by the electric motors 241) may flow through the heat exchanger 1111 via the thermal channel loop 1110. The heat exchanger 1111 may then transfer the thermal energy away from the heated fluid and into the air proximate to the heat exchanger 1111, which may cause this air to be heated and may facilitate a cooling of the fluid. The cooled fluid may circulate away from the heat exchanger 1111 via the thermal channel loop 1110 and may again flow towards the electric motors 241, such that additional thermal energy generated by the electric motors 241 may be transferred away from the motors 241 and into the fluid.

In one implementation, the computing system 1140 may receive one or more user inputs indicating that the airframe temperature of the airframe section is to be regulated, where the one or more user inputs may be received during and/or after the operation of the electric motors 241. In particular, the one or more user inputs may indicate that the airframe section is to be warmed using the aircraft thermal management system 250. The one or more user inputs may be provided by one or more human pilots and/or one or more human passengers using one or more input devices of the computing system 1140. The one or more user inputs may be any type of user input known to those skilled in the art, including, but not limited to, the activation of an electronic button, a contact input on a touch sensitive panel, and/or the like.

In response to the one or more user inputs, the computing system 1140 may enable an airframe heating mode for the aircraft thermal management system 250. In the airframe heating mode, the aircraft thermal management system 250 may be configured to help warm the airframe section (not shown). In particular, in the airframe heating mode, the computing system 1140 may adjust the valve 1150 so that, after receiving the flow of heated air (i.e., the thermal energy generated by the electric motors 241) via the heat exchanger 1111 and the fan 1120, the valve 1150 may direct the flow of heated air to the air outlet 1160. The computing system 1140 may adjust the valve 1150 by controlling the one or more actuators of the valve 1150. In some implementations, the computing system 1140 may increase the fan speed of the fan 1120 so that the valve 1150 receives an increased flow of the heated air. The air outlet 1160 may receive the heated air via the valve 1150, and the heated air may then pass through the air outlet 1160 to one or more openings 1161 of the air outlet 1160. The airframe section may then receive the heated air (i.e., the thermal energy generated by the electric motors 241) via the one or more openings 1161. As a result, the airframe section may be warmed by the heated air (i.e., the thermal energy generated by the electric motors 241). In some implementations, the heated air transferred via the one or more openings 1161 may be used to warm the interior surface and/or the exterior surface of the fuselage 210 for a de-icing operation.

Accordingly, in the airframe heating mode, the aircraft thermal management system 250 may help to warm the airframe section by transferring thermal energy generated by the electric motors 241 to the airframe section. In such an implementation, the electric motors 241 may serve as a heat source for the airframe section.

In a further implementation, after a period of time from when the computing system 1140 has enabled the airframe heating mode, the computing system 1140 may receive one or more additional user inputs indicating that the airframe temperature of the airframe section is to no longer be regulated. For example, the one or more additional user inputs may indicate that the airframe section is to no longer be warmed using the aircraft thermal management system 250. In such an implementation, the computing system 1140 may disable the airframe heating mode for the aircraft thermal management system 250, such that the aircraft thermal management system 250 halts the transfer of thermal energy generated by the electric motors 241 (i.e., the thermal energy generated by the electric motors 241) to the airframe section. Instead, the computing system 1140 may control the one or more actuators of the valve 1150 so that the valve 1150 may direct the flow of the heated air (i.e., the thermal energy generated by the electric motors 241) to the exterior of the helicopter 200.

As noted above, the aircraft thermal management system 250 may, along with one or more components of a fluid heat transfer system, include any components known to those skilled in the art that can be used to transfer thermal energy generated by the electric motors 241 to the airframe section. Accordingly, the components of the aircraft thermal management system 250 are not limited to the types and/or configurations described above.

4. Window Section

In one implementation, the aircraft thermal management system 250 of FIG. 2 may use a fluid heat transfer system (not shown) to transfer thermal energy to the window section 212 of the fuselage 210, where the thermal energy may have been generated by the electric motors 241 in response to an operation of the motors 241, such as during and/or after the operation of the motors 241. As explained above, the window section 212 may include an area of the fuselage 210 in which one or more windows of the helicopter 200 are disposed. In some implementations, the aircraft thermal management system 250 may be used to regulate a window temperature of the window section 212. In one implementation, the aircraft thermal management system 250 may be used to regulate the window temperature in order to perform a de-icing operation on the one or more windows of the window section 212.

Figure 12:
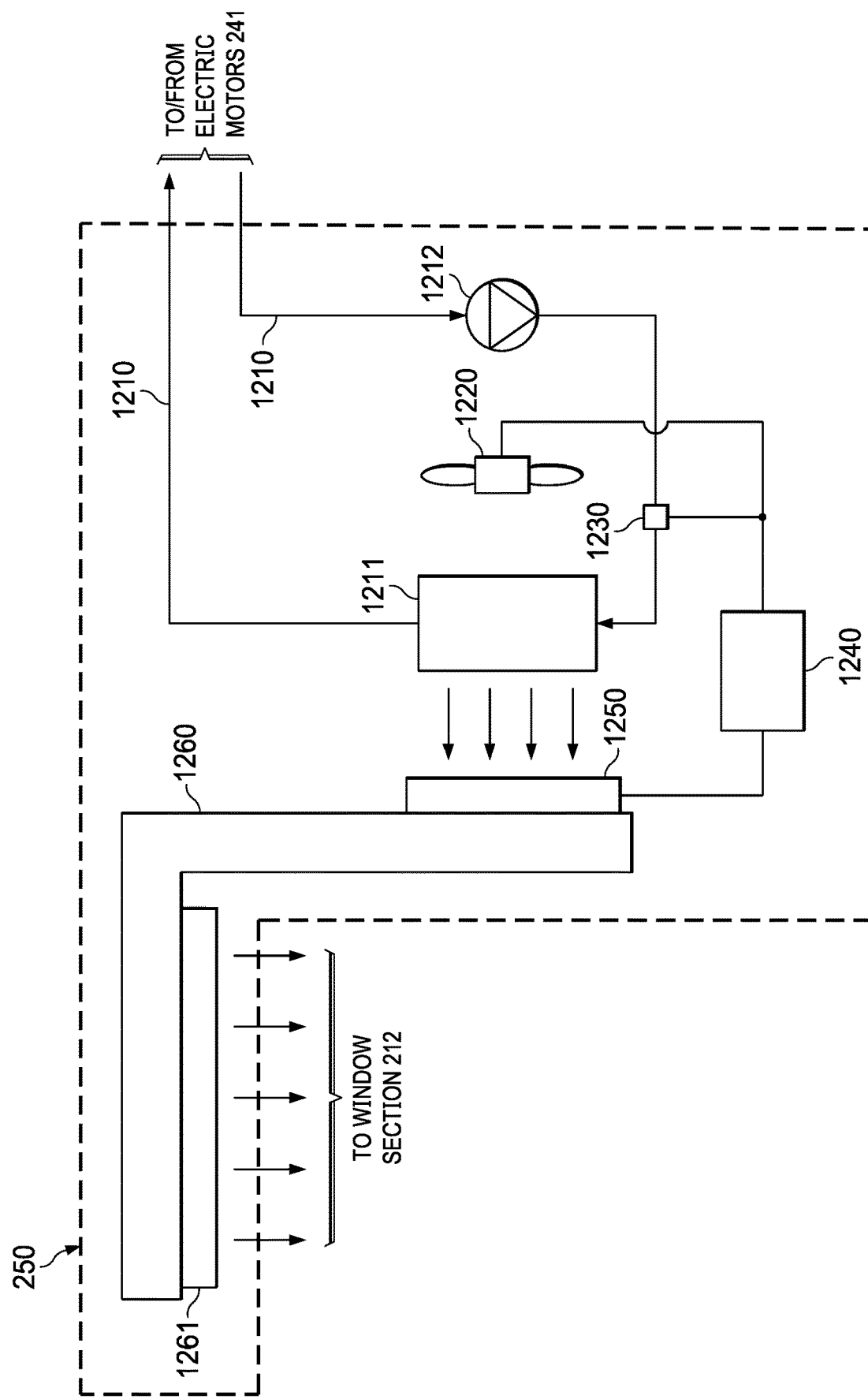

The aircraft thermal management system 250 may include one or more components of a fluid heat transfer system for use in transferring the thermal energy to the window section 212. As noted above, the components of a fluid heat transfer system may include at least a fluid, one or more thermal channels, and/or the like. The aircraft thermal management system 250 may also include any other components known to those skilled in the art that can be used to transfer the thermal energy to the window section 212. For example, FIG. 12 illustrates a schematic diagram of the aircraft thermal management system 250 in accordance with implementations of various techniques described herein, where the aircraft thermal management system 250 includes a thermal channel loop 1210 and a fluid (not shown). The thermal channel loop 1210 may correspond to the one or more connections 251 of FIG. 2. As shown in FIG. 12, the aircraft thermal management system 250 may also include a heat exchanger 1211, a pump 1212, a fan 1220, a fluid temperature sensor 1230, a computing system 1240, a valve 1250, and an air outlet 1260. As noted above, the aircraft thermal management system 250 may be disposed in the fuselage 210 (not shown).

As mentioned above, the fluid and the thermal channel loop 1210 may be used to transfer the thermal energy (i.e., heat) generated by the electric motors 241 away from the motors 241, such as during and/or after an operation of the motors 241. In particular, the fluid and the thermal channel loop 1210 may be used to transfer the thermal energy generated by the electric motors 241 (not shown) to the window section 212 of the helicopter 200 via the flow of the fluid through the thermal channel loop 1210.

The fluid, the thermal channel loop 1210, the heat exchanger 1211, the pump 1212, and the fan 1220, respectively, may be the same as the fluid, the thermal channel loop 810, the heat exchanger 811, the pump 812, and the fan 820, respectively, discussed above with respect to FIGS. 8-9. In one implementation, the fluid may circulate within the thermal channel loop 1210, such as through, at least in part, the use of the pump 1212. In such an implementation, during and/or after an operation of the electric motors 241, the thermal energy (i.e., heat) generated by the motors 241 may be transferred away from the motors 241 and into the fluid of the thermal channel loop 1210, which may facilitate a cooling of the motors 241 and may cause the fluid to be heated. Using the thermal channel loop 1210, the heated fluid (i.e., the thermal energy generated by the electric motors 241) may then circulate away from the electric motors 241 and to the aircraft thermal management system 250 (and thus the fuselage 210). The heated fluid (i.e., the thermal energy generated by the electric motors 241) may flow through the heat exchanger 1211, such that the heat exchanger 1211 may be configured to transfer the thermal energy away from the heated fluid and into the air proximate to the heat exchanger 1211, thereby causing this air to be heated and facilitating a cooling of the fluid. As explained above with respect to FIG. 8-9, the cooled fluid may circulate away from the heat exchanger 1211 via the thermal channel loop 1210 and may again flow towards the electric motors 241, such that additional thermal energy generated by the electric motors 241 may be transferred away from the motors 241 and into the fluid. The fan 1220 may be used to circulate the heated air (i.e., the thermal energy generated by the electric motors 241) proximate to the heat exchanger 1211 in a direction away from the heat exchanger 1211.

The valve 1250 and the air outlet 1260 may be used to transfer the thermal energy generated by the electric motors 241 to the window section 212. In particular, the fan 1220 may be configured to circulate the heated air (i.e., the thermal energy generated by the electric motors 241) away from the heat exchanger 1211 and toward the valve 1250. Thus, the valve 1250 may be configured to receive a flow of the heated air via the heat exchanger 1211 and the fan 1220. In some instances, the valve 1250 may then be used to direct this flow of heated air to the air outlet 1260. The valve 1250 may be any valve known to those skilled in the art, including, but not limited to, a damper valve. In a further implementation, the valve 1250 may be controlled using one or more actuators (not shown).

The air outlet 1260 may be configured to receive the flow of heated air via the valve 1250, such that the heated air may pass through the air outlet 1260 and to the window section 212 via one or more openings 1261 of the air outlet 1260. The air outlet 1260 and its one or more openings 1261 may be the same as the air outlet 760 and its one or more openings 761 described above with respect to FIG. 7. Those skilled in the art will understand that a configuration of the aircraft thermal management system 250, including the air outlet 1260 and its one or more openings 1261, is not limited to the configuration shown in FIG. 12.

Thus, the fan 1220, the valve 1250, and the air outlet 1260 may be used together to direct the heated air (i.e., the thermal energy generated by the electric motors 241) to the window section 212, thereby helping to transfer the thermal energy generated by the electric motors 241 to the window section 212. As a result, the window section 212 may be warmed by the heated air (i.e., the thermal energy generated by the electric motors 241). In some implementations, the heated air may be used to warm an interior surface and/or an exterior surface of one or more windows of the window section 212 for a de-icing operation. In a further implementation, the valve 1250 may be adjusted so that it may instead direct the flow of heated air (i.e., the thermal energy generated by the electric motors 241) to an exterior of the helicopter 200 using a different air outlet (not shown), thereby helping to transfer the thermal energy generated by the electric motors 241 away from the window section 212 and to the outside of the helicopter 200. In such an implementation, the valve 1250 may be adjusted by controlling one or more of its actuators.

The fluid temperature sensor 1230 may be the same as the fluid temperature sensor 830 described earlier with respect to FIGS. 8-9. The computing system 1240 may be used to control the aircraft thermal management system 250, such as by communicating with one or more components of the aircraft thermal management system 250. In one implementation, the computing system 1240 may be in communication with the fan 1220, the valve 1250, and/or the fluid temperature sensor 1230. In such an implementation, the computing system 1240 may be used to control the operation of the fan 1220, such as by controlling a fan speed and/or whether the fan 1220 is operational. In another implementation, the computing system 1240 may be used to control one or more actuators of the valve 1250, such that the computing system 1240 may control a direction of the flow of heated air received by the valve 1250 (e.g., whether the heated air is directed to the air outlet 1260 or to an exterior of the helicopter 200). In yet another implementation, the computing system 1240 may be configured to receive one or more measurements from the fluid temperature sensor 1230. The computing system 1240 may also be in communication with and/or used to control other components of the helicopter 200, such as the main rotor system 220 (not shown), the tail rotor system 240 (not shown), one or more other onboard electric components, and/or one or more other onboard computing systems.

The computing system 1240 may communicate with one or more components of the aircraft thermal management system 250 and/or with other components of the helicopter 200 using any type of communication (e.g., wired and/or wireless) known to those skilled in the art. As similarly explained above with respect to the computing system 340 of FIG. 3, at least a portion of the computing system 1240 may be disposed within and/or proximate to the cabin section 211 (not shown), including, but not limited to, the one or more input devices and/or the one or more output devices described above. The computing system 1240 is described in further detail in a later section.

In operation, the aircraft thermal management system 250 may use the above-described components to transfer thermal energy to the window section 212, where the thermal energy may have been generated by the electric motors 241 in response to an operation of the motors 241, such as during and/or after the operation of the motors 241. In particular, the aircraft thermal management system 250 may use the above-described components to regulate the window temperature of the window section 212. In one implementation, the aircraft thermal management system 250 may regulate the window temperature in order to perform a de-icing operation on the one or more windows of the window section 212.

Initially, such as after a takeoff of the helicopter 200, the aircraft thermal management system 250 may use the above-described components to facilitate a cooling of the electric motors 241 during and/or after an operation of the motors 241. As explained earlier, fluid may circulate within the thermal channel loop 1210 due to, at least in part, the pump 1212. In addition, during and/or after the operation of the electric motors 241, the thermal energy generated by the motors 241 may be transferred away from the motors 241 and into the fluid as it flows past the motors 241 in the thermal channel loop 1210, which may facilitate a cooling of the motors 241 and may cause the fluid to be heated. The heated fluid (i.e., the thermal energy generated by the electric motors 241) may then circulate away from the electric motors 241 and toward the portion of the thermal channel loop 1210 disposed in the aircraft thermal management system 250. In particular, the heated fluid (i.e., the thermal energy generated by the electric motors 241) may flow through the heat exchanger 1211 via the thermal channel loop 1210. The heat exchanger 1211 may then transfer the thermal energy away from the heated fluid and into the air proximate to the heat exchanger 1211, which may cause this air to be heated and may facilitate a cooling of the fluid. The cooled fluid may circulate away from the heat exchanger 1211 via the thermal channel loop 1210 and may again flow towards the electric motors 241, such that additional thermal energy generated by the electric motors 241 may be transferred away from the motors 241 and into the fluid.

In one implementation, the computing system 1240 may receive one or more user inputs indicating that the window temperature of the window section 212 is to be regulated, where the one or more user inputs may be received during and/or after the operation of the electric motors 241. In particular, the one or more user inputs may indicate that the window section 212 is to be warmed using the aircraft thermal management system 250. The one or more user inputs may be provided by one or more human pilots and/or one or more human passengers using one or more input devices of the computing system 1240. The one or more user inputs may be any type of user input known to those skilled in the art, including, but not limited to, the activation of an electronic button, a contact input on a touch sensitive panel, and/or the like.

In response to the one or more user inputs, the computing system 1240 may enable a window heating mode for the aircraft thermal management system 250. In the window heating mode, the aircraft thermal management system 250 may be configured to help warm the window section 212. In particular, in the window heating mode, the computing system 1240 may adjust the valve 1250 so that, after receiving the flow of heated air (i.e., the thermal energy generated by the electric motors 241) via the heat exchanger 1211 and the fan 1220, the valve 1250 may direct the flow of heated air to the air outlet 1260. The computing system 1240 may adjust the valve 1250 by controlling the one or more actuators of the valve 1250. In some implementations, the computing system 1240 may increase the fan speed of the fan 1220 so that the valve 1250 receives an increased flow of the heated air. The air outlet 1260 may receive the heated air via the valve 1250, and the heated air may then pass through the air outlet 1260 to one or more openings 1261 of the air outlet 1260. The window section 212 may then receive the heated air (i.e., the thermal energy generated by the electric motors 241) via the one or more openings 1261. As a result, the window section 212 may be warmed by the heated air (i.e., the thermal energy generated by the electric motors 241). In some implementations, the heated air transferred via the one or more openings 1261 may be used to warm an interior surface and/or an exterior surface of one or more windows of the window section 212 for a de-icing operation.

Accordingly, in the window heating mode, the aircraft thermal management system 250 may help to warm the window section 212 by transferring thermal energy generated by the electric motors 241 to the window section 212. In such an implementation, the electric motors 241 may serve as a heat source for the window section 212.

In a further implementation, after a period of time from when the computing system 1240 has enabled the window heating mode, the computing system 1240 may receive one or more additional user inputs indicating that the window temperature of the window section 212 is to no longer be regulated. For example, the one or more additional user inputs may indicate that the window section 212 is to no longer be warmed using the aircraft thermal management system 250. In such an implementation, the computing system 1240 may disable the window heating mode for the aircraft thermal management system 250, such that the aircraft thermal management system 250 halts the transfer of thermal energy generated by the electric motors 241 (i.e., the thermal energy generated by the electric motors 241) to the window section 212. Instead, the computing system 1240 may control the one or more actuators of the valve 1250 so that the valve 1250 may direct the flow of the heated air (i.e., the thermal energy generated by the electric motors 241) to the exterior of the helicopter 200.

As noted above, the aircraft thermal management system 250 may, along with one or more components of a fluid heat transfer system, include any components known to those skilled in the art that can be used to transfer thermal energy generated by the electric motors 241 to the window section 212. Accordingly, the components of the aircraft thermal management system 250 are not limited to the types and/or configurations described above.

Accordingly, in view of the implementations discussed above with respect to FIGS. 8-12, an aircraft thermal management system may use a fluid heat transfer system to transfer thermal energy to one or more fuselage sections of an electric aircraft, where the thermal energy may have been generated by one or more electric motors in response to an operation of the motors, such as during and/or after the operation of the motors. In some implementations, the aircraft thermal management system may use the fluid heat transfer system to regulate one or more temperatures of the one or more fuselage sections. In one such implementation, the one or more electric motors of the electric aircraft may serve as a heat source for the one or more fuselage sections. In another implementation, the aircraft thermal management system may use the fluid heat transfer system to transfer thermal energy to other fuselage sections not mentioned above and/or other areas of the electric aircraft.

In a further implementation, an aircraft thermal management system that uses a fluid heat transfer system may incorporate more than one of the implementations described above with respect to FIGS. 8-12. For example, an aircraft thermal management system may use a fluid heat transfer system to transfer thermal energy to both a cabin section and to a battery section of an electric aircraft. In some implementations, an aircraft thermal management system using a fluid heat transfer system may include one or more components in configurations that are different from those described herein, including with a quantity of components and/or with types of components that are different from those mentioned above. For example, the aircraft thermal management system using a fluid heat transfer system may incorporate one or more electric generators, such that a thermal channel loop of the fluid heat transfer system may be configured to also transfer thermal energy generated by the one or more electric generators to the one or more fuselage sections of the electric aircraft.

Further, in some implementations, an aircraft thermal management system may use and/or include both the resistor system and the fluid heat transfer system. Thus, in view of the implementations discussed above with respect to FIGS. 1-12, an aircraft thermal management system may use the resistor system and/or the fluid heat transfer system to transfer thermal energy to one or more fuselage sections of an electric aircraft, where the thermal energy may have been generated by one or more electric motors. In some implementations, the aircraft thermal management system may use both the resistor system and the fluid heat transfer system to regulate one or more temperatures of the one or more fuselage sections, such that the one or more electric motors of the electric aircraft serve as a heat source for the one or more fuselage sections. For example, an aircraft thermal management system may use a fluid heat transfer system to transfer thermal energy to a cabin section and may use a resistor system to transfer thermal energy to a battery section of an electric aircraft. In another implementation, the aircraft thermal management system may use both the resistor system and the fluid heat transfer system to transfer thermal energy to other fuselage sections not mentioned above and/or other areas of the electric aircraft. In yet another implementation, the aircraft thermal management system may use the resistor system and/or the fluid heat transfer system to transfer thermal energy between the one or more electric motors and the one or more fuselage sections, including for implementations where the one or more electric motors serve as a heat sink for the one or more fuselage sections.

In sum, implementations relating to an aircraft thermal management system may be used to transfer thermal energy for one or more fuselage sections of an electric aircraft, thereby reducing or altogether eliminating the use of conventional HVAC systems for transferring this thermal energy for the one or more fuselage sections. For example, an electric aircraft that includes an aircraft thermal management system disclosed herein may include a supplemental HVAC system that is smaller in size, weight, and/or complexity than a conventional HVAC system. By reducing or eliminating the use of conventional HVAC systems, the electric aircraft may carry less weight, may have an increased aircraft range, and/or may have more available space onboard. In addition, an electric aircraft that includes an aircraft thermal management system disclosed herein may be able to transfer thermal energy for one or more of its fuselage sections more efficiently and/or more quickly, such as with the use of the supplemental HVAC system mentioned above.

II. Computing System

Figure 13:
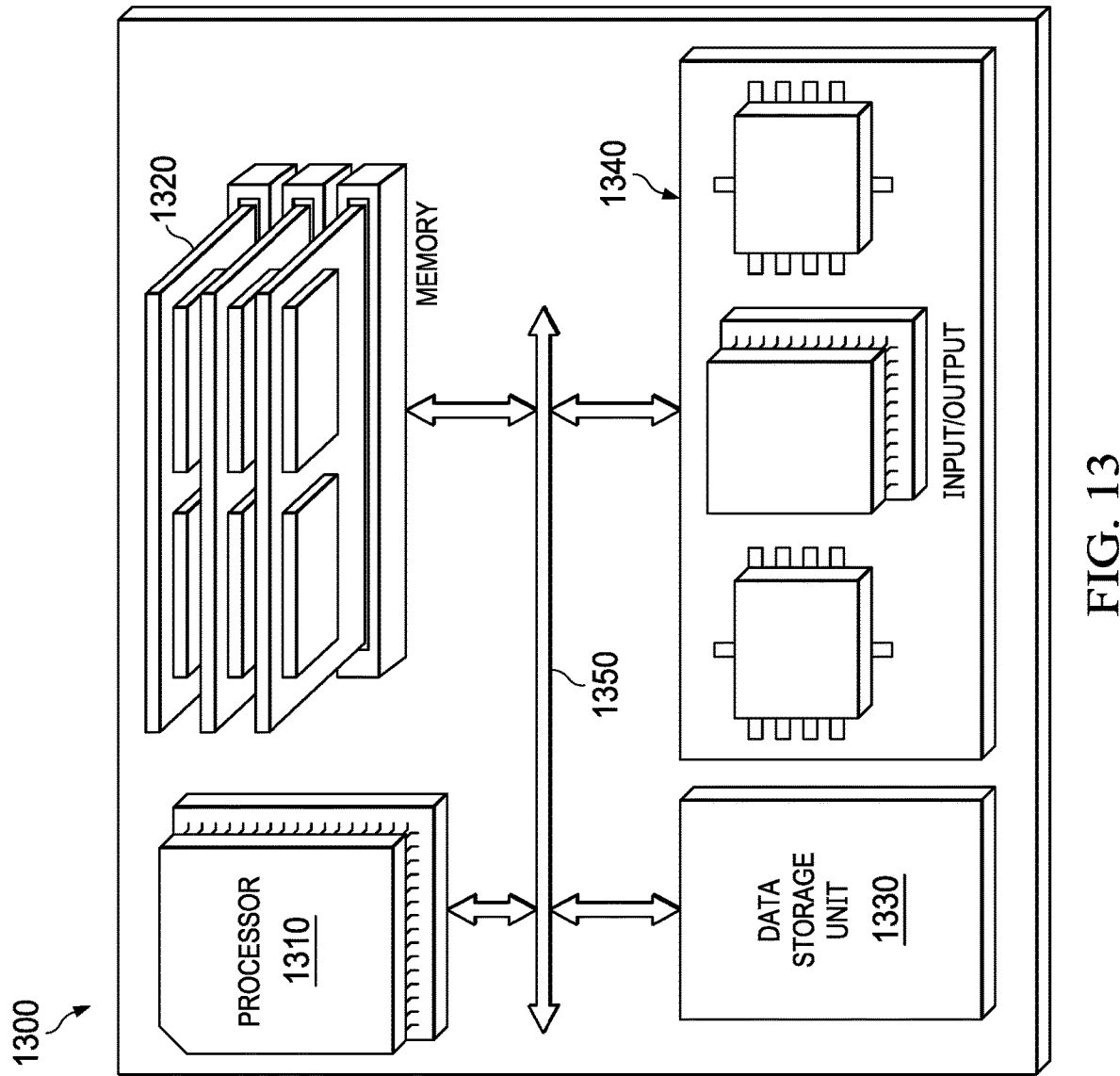
FIG. 13 illustrates a block diagram of a hardware configuration in which one or more various technologies described herein may be incorporated and practiced.

FIG. 13 illustrates a block diagram of a hardware configuration 1300 in which one or more various technologies described herein may be incorporated and practiced. The hardware configuration 1300 can be used to implement the computing systems discussed above, such as the computing systems discussed above with respect to FIGS. 1-12. The hardware configuration 1300 can include a processor 1310, a memory 1320, a storage device 1330, and one or more input/output devices 1340. Each of the components 1310, 1320, 1330, and 1340 can, for example, be interconnected using a system bus 1350. The processor 1310 can be capable of processing instructions for execution within the hardware configuration 1300. In one implementation, the processor 1310 can be a single-threaded processor. In another implementation, the processor 1310 can be a multi-threaded processor. The processor 1310 can be capable of processing instructions stored in the memory 1320 or on the storage device 1330.

The memory 1320 can store information within the hardware configuration 1300. In one implementation, the memory 1320 can be a computer-readable medium. In one implementation, the memory 1320 can be a volatile memory unit. In another implementation, the memory 1320 can be a non-volatile memory unit.

In some implementations, the storage device 1330 can be capable of providing mass storage for the hardware configuration 1300. In one implementation, the storage device 1330 can be a computer-readable medium. In various different implementations, the storage device 1330 can, for example, include a hard disk device/drive, an optical disk device, flash memory or some other large capacity storage device. In other implementations, the storage device 1330 can be a device external to the hardware configuration 1300. Various implementations for the memory 1320 and/or the storage device 1330 are further discussed below.

The one or more input/output devices 1340 can provide input/output operations for the hardware configuration 1300. In one implementation, the one or more input/output devices 1340 can include one or more display system interfaces, sensors and/or data transfer ports. The one or more input/output devices 1340 may include the one or more input devices and/or the one or more output devices discussed above with respect to FIGS. 1-12.

The subject matter of this disclosure, and/or components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output thereby tying the process to a particular machine, e.g., a machine programmed to perform the processes described herein. The processes and logic flows can also be performed by, and apparatus can also be implemented as, special purpose logic circuitry, e.g., an FPGA (field programmable gate array) or an ASIC (application specific integrated circuit).

Computer readable media (e.g., memory 1320 and/or the storage device 1330) suitable for storing computer program instructions and data may include all forms of non-volatile memory, media, and memory devices, including, by way of example, any semiconductor memory devices (e.g., EPROM, EEPROM, solid state memory devices, and flash memory devices); any magnetic disks (e.g., internal hard disks or removable disks); any magneto optical disks; and any CD-ROM and DVD-ROM disks. The processor and the memory can be supplemented by, or incorporated in, special purpose logic circuitry.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention is not limited to the implementations and illustrations contained herein but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. An aircraft comprising:
a fuselage comprising one or more fuselage sections;
one or more electric motors configured to drive one or more propulsion systems of the aircraft, wherein the one or more electric motors are configured to generate thermal energy by generating electrical energy in response to a deceleration of the aircraft;
one or more resistors configured to dissipate the thermal energy to air proximate to the one or more resistors based on the electrical energy;
an aircraft thermal management system configured to transfer the thermal energy generated by the one or more electric motors to the one or more fuselage sections and comprising a resistor temperature sensor configured to measure a resistor temperature of the one or more resistors;
a fan configured to circulate the air proximate to the one or more resistors;
wherein the aircraft thermal management system is further configured to control a valve to direct the circulated air received from the fan to an air outlet if a combination of one or more measurements from the resistor temperature sensor and one or more measurements from a cabin temperature sensor indicate that the resistor temperature is greater than a cabin temperature.

2. The aircraft of claim 1, wherein the fuselage comprises one or more fuselage sections and the aircraft thermal management system is configured to regulate one or more temperatures of the one or more fuselage sections by transferring the thermal energy to the one or more fuselage sections, wherein the one or more temperatures comprise a cabin temperature, a battery temperature, an airframe temperature, a window temperature, or combinations thereof.

3. The aircraft of claim 1, wherein the one or more propulsion systems comprise one or more rotor systems, one or more propeller systems, or combinations thereof.

4. The aircraft of claim 1, wherein the fuselage comprises one or more fuselage sections and
the aircraft thermal management system is configured to transfer the thermal energy generated by the one or more electric motors to the one or more fuselage sections by transferring the thermal energy dissipated by the one or more resistors to the one or more fuselage sections.

5. The aircraft of claim 4, wherein
the aircraft thermal management system is configured to transfer the thermal energy dissipated by the one or more resistors to the one or more fuselage sections by circulating the air proximate to the one or more resistors to the one or more fuselage sections,
wherein the aircraft thermal management system further comprises:
a valve configured to receive circulated air from the fan and to direct the circulated air received from the fan in one or more directions; and
an air outlet configured to receive the circulated air from the valve and to transfer the circulated air received from the valve to the one or more fuselage sections.

6. The aircraft of claim 5, wherein:
the one or more fuselage sections comprise a cabin section comprising a cabin configured to transport one or more human pilots, one or more human passengers, cargo, or combinations thereof;
the aircraft thermal management system further comprises a
cabin temperature sensor configured to measure a cabin temperature of the cabin section; and
the aircraft thermal management system is configured to:
circulate the air proximate to the one or more resistors to the cabin section;
receive one or more user inputs indicating that the cabin temperature is to be regulated;
receive one or more measurements from the resistor temperature sensor;
receive one or more measurements from the cabin temperature sensor; and
control the valve to direct the circulated air received from the fan based on the one or more user inputs, the one or more measurements from the resistor temperature sensor, the one or more measurements from the cabin temperature sensor, or combinations thereof.

7. The aircraft of claim 6, wherein:
the one or more user inputs indicate that the cabin section is to be warmed, and wherein the aircraft thermal management system is configured to:
control the valve to direct the circulated air received from the fan to the air outlet if the one or more measurements from the resistor temperature sensor and the one or more measurements from the cabin temperature sensor indicate that the resistor temperature is greater than the cabin temperature,
wherein the air outlet is configured to:
receive the circulated air from the valve and to transfer the circulated air received from the valve to the cabin section; and
control the valve to direct the circulated air received from the fan in a direction away from the cabin section if the one or more measurements from the resistor temperature sensor and the one or more measurements from the cabin temperature sensor indicate that the resistor temperature is less than or equal to the cabin temperature; or the one or more user inputs indicate a minimum cabin temperature level for the cabin section, and
wherein the aircraft thermal management system is configured to control the valve to direct the circulated air received from the fan to the air outlet if the one or more measurements from the resistor temperature sensor and the one or more measurements from the cabin temperature sensor indicate that the cabin temperature is less than the minimum cabin temperature level and indicate that the resistor temperature is greater than the cabin temperature,
wherein the air outlet is configured to:
receive the circulated air from the valve and to transfer the circulated air received from the valve to the cabin section; and
control the valve to direct the circulated air received from the fan in a direction away from the cabin section if the one or more measurements from the resistor temperature sensor and the one or more measurements from the cabin temperature sensor indicate that the cabin temperature is greater than or equal to the minimum cabin temperature level or indicate that the resistor temperature is less than or equal to the cabin temperature.

8. The aircraft of claim 5, wherein:
the one or more fuselage sections comprise a battery section comprising a battery pack configured to provide electric power to the aircraft;
the aircraft thermal management system further comprises a battery temperature sensor configured to measure a battery temperature of the battery pack; and
the aircraft thermal management system is configured to circulate the air proximate to the one or more resistors to the battery section, wherein the aircraft thermal management system is configured to:
receive one or more user inputs indicating a minimum battery temperature level for the battery pack;
receive one or more measurements from the resistor temperature sensor;
receive one or more measurements from the battery temperature sensor; and
control the valve to direct the circulated air received from the fan to the air outlet if the one or more measurements from the resistor temperature sensor and the one or more measurements from the battery temperature sensor indicate that the battery temperature is less than the minimum battery temperature level and indicate that the resistor temperature is greater than the battery temperature, wherein the air outlet is configured to receive the circulated air from the valve and to transfer the circulated air received from the valve to the battery section;
wherein the air outlet is configured to:
receive the circulated air from the valve and to transfer the circulated air received from the valve to the battery section; and
control the valve to direct the circulated air received from the fan in a direction away from the battery section if the one or more measurements from the resistor temperature sensor and the one or more measurements from the battery temperature sensor indicate that the battery temperature is greater than or equal to the minimum battery temperature level or indicate that the resistor temperature is less than or equal to the battery temperature.

9. The aircraft of claim 5, wherein:
the one or more fuselage sections comprise an airframe section comprising a structure of the fuselage, a window section comprising one or more windows of the aircraft, or combinations thereof; and
the aircraft thermal management system is configured to:
circulate the air proximate to the one or more resistors to the airframe section;
receive one or more user inputs indicating that the airframe section is to be warmed; and
control the valve to direct the circulated air received from the fan to the air outlet, the air outlet is configured to:
receive the circulated air from the valve and to transfer the circulated air received from the valve to the airframe section; and
circulate the air proximate to the one or more resistors to the window section, the aircraft thermal management system is further configured to:
receive one or more user inputs indicating that the window section is to be warmed; and
control the valve to direct the circulated air received from the fan to the air outlet, and the air outlet is further configured to receive the circulated air from the valve, and to transfer the circulated air received from the valve to the window section, or combinations thereof.

10. The aircraft of claim 5, wherein the aircraft thermal management system is configured to control the valve based on at least one of a relative temperature of relationship between one or more measurements of a temperature sensor and a cabin temperature sensor versus a minimum cabin temperature level, one or more measurements of the resistor temperature sensor and a battery temperature sensor versus a minimum battery temperature level, one or more measurements of a fluid temperature sensor and the cabin temperature sensor versus the minimum cabin temperature level, or one or more measurements from the fluid temperature sensor and the battery temperature sensor versus the minimum battery temperature level.

11. An aircraft comprising:
a fuselage comprising a cabin;
one or more electric motors configured to drive one or more propulsion systems of the aircraft, wherein the one or more electric motors are configured to generate thermal energy by generating electrical energy in response to a deceleration of the aircraft;
one or more resistors configured to dissipate the thermal energy to air proximate to the one or more resistors based on the electrical energy;
an aircraft thermal management system comprising a resistor temperature sensor configured to measure a resistor temperature of the one or more resistors; and
a fan configured to circulate the air proximate to the one or more resistors;
wherein the aircraft thermal management system is configured to control a valve to direct the circulated air to the cabin if a combination of at least one measurement from the resistor temperature sensor and at least one measurement from a cabin temperature sensor indicates that the resistor temperature is greater than a temperature of the cabin.

12. The aircraft of claim 11, wherein
the one or more electric motors are configured to generate the thermal energy by generating electrical energy in response to an operation of the one or more electric motors.

13. An aircraft comprising:
a fuselage comprising:
one or more fuselage sections;
one or more electric motors configured to drive one or more propulsion systems of the aircraft, wherein the one or more electric motors are configured to generate thermal energy by generating electrical energy in response to a deceleration of the aircraft;
one or more resistors configured to dissipate the thermal energy to air proximate to the one or more resistors based on the electrical energy;
an aircraft thermal management system configured to transfer the thermal energy generated by the one or more electric motors to the one or more fuselage sections and comprising a resistor temperature sensor configured to measure a resistor temperature of the one or more resistors, wherein the aircraft thermal management system comprises a fluid heat transfer system, the fluid heat transfer system comprising:
a fluid;
a thermal channel loop comprising one or more thermal channels and having at least a portion disposed at least proximate to the one or more electric motors, wherein the thermal channel loop is configured to allow the fluid to circulate therein and to allow the thermal energy generated by the one or more electric motors to be transferred to the fluid;
a fluid temperature sensor configured to measure a fluid temperature of the fluid within the thermal channel loop; and
a heat exchanger configured to transfer the thermal energy from the fluid within the thermal channel loop to air proximate to the heat exchanger; and
a fan configured to circulate the air proximate to the heat exchanger;
wherein the aircraft thermal management system is configured to transfer the thermal energy generated by the one or more electric motors to the one or more fuselage sections using the fluid heat transfer system;
wherein the aircraft thermal management system is further configured to control a valve to direct the circulated air received from the fan to an air outlet if a combination of one or more measurements from the resistor temperature sensor and one or more measurements from a cabin temperature sensor indicate that the resistor temperature is greater than the cabin temperature.

14. The aircraft of claim 13, wherein:
the valve is configured to receive the circulated air from the fan and to direct the circulated air received from the fan in one or more directions; and
the air outlet is configured to receive the circulated air from the valve and to transfer the circulated air received from the valve to the one or more fuselage sections, thereby transferring the thermal energy generated by the one or more electric motors to the one or more fuselage sections.

15. The aircraft of claim 13, wherein the one or more fuselage sections comprise a cabin section comprising a cabin configured to transport one or more human pilots, one or more human passengers, cargo, or combinations thereof and wherein:
the cabin temperature sensor is configured to measure a cabin temperature of the cabin section, and
the aircraft thermal management system is configured to:
receive one or more user inputs indicating that the cabin temperature is to be regulated;
receive one or more measurements from the fluid temperature sensor;
receive one or more measurements from the cabin temperature sensor; and
control the valve to direct the circulated air received from the fan based on the one or more user inputs, the one or more measurements from the fluid temperature sensor, the one or more measurements from the cabin temperature sensor, or combinations thereof.

16. The aircraft of claim 15, wherein:
the one or more user inputs indicate that the cabin section is to be warmed,
the aircraft thermal management system is configured to control the valve to direct the circulated air received from the fan to the air outlet if the one or more measurements from the fluid temperature sensor and the one or more measurements from the cabin temperature sensor indicate that the fluid temperature is greater than the cabin temperature,
the air outlet is configured to:
receive the circulated air from the valve and to transfer the circulated air received from the valve to the cabin section; and
control the valve to direct the circulated air received from the fan in a direction away from the cabin section if the one or more measurements from the fluid temperature sensor and the one or more measurements from the cabin temperature sensor indicate that the fluid temperature is less than or equal to the cabin temperature; or the one or more user inputs indicate a minimum cabin temperature level for the cabin section, and
the aircraft thermal management system is configured to:
control the valve to direct the circulated air received from the fan to the air outlet if the one or more measurements from the fluid temperature sensor and the one or more measurements from the cabin temperature sensor indicate that the cabin temperature is less than the minimum cabin temperature level and indicate that the fluid temperature is greater than the cabin temperature, wherein the air outlet is configured to receive the circulated air from the valve and to transfer the circulated air received from the valve to the cabin section; and
control the valve to direct the circulated air received from the fan in a direction away from the cabin section if the one or more measurements from the fluid temperature sensor and the one or more measurements from the cabin temperature sensor indicate that the cabin temperature is greater than or equal to the minimum cabin temperature level or indicate that the fluid temperature is less than or equal to the cabin temperature.

17. The aircraft of claim 13, wherein:
the one or more fuselage sections comprise a battery section comprising a battery pack configured to provide electric power to the aircraft;
the aircraft thermal management system further comprises a battery temperature sensor configured to measure a battery temperature of the battery pack;
the aircraft thermal management system is configured to:
transfer the thermal energy generated by the one or more electric motors to the battery section using the fluid heat transfer system;
receive one or more user inputs indicating a minimum battery temperature level for the battery pack;
receive one or more measurements from the fluid temperature sensor; receive one or more measurements from the battery temperature sensor; and
control the valve to direct the circulated air received from the fan to the air outlet if the one or more measurements from the fluid temperature sensor and the one or more measurements from the battery temperature sensor indicate that the battery temperature is less than the minimum battery temperature level and indicate that the fluid temperature is greater than the battery temperature, and
the air outlet is configured to:
receive the circulated air from the valve and to transfer the circulated air received from the valve to the battery section; and
control the valve to direct the circulated air received from the fan in a direction away from the battery section if the one or more measurements from the fluid temperature sensor and the one or more measurements from the battery temperature sensor indicate that the battery temperature is greater than or equal to the minimum battery temperature level or indicate that the fluid temperature is less than or equal to the battery temperature.

18. The aircraft of claim 13, wherein:

the one or more fuselage sections comprise an airframe section comprising a structure of the fuselage, a window section comprising one or more windows of the aircraft, or combinations thereof; and the aircraft thermal management system is configured to:
- transfer the thermal energy generated by the one or more electric motors to the airframe section,
- receive one or more user inputs indicating that the airframe section is to be warmed;
- control the valve to direct the circulated air received from the fan to the air outlet, wherein the air outlet is configured to receive the circulated air from the valve and to transfer the circulated air received from the valve to the airframe section;
- transfer the thermal energy generated by the one or more electric motors to the window section;
- receive one or more user inputs indicating that the window section is to be warmed; and
- control the valve to direct the circulated air received from the fan to the air outlet, wherein the air outlet is configured to receive the circulated air from the valve and to transfer the circulated air received from the valve to the window section; or combinations thereof.

* * * * *